(12) United States Patent
Bonetti et al.

(10) Patent No.: US 11,309,972 B2
(45) Date of Patent: Apr. 19, 2022

(54) OPTICAL COMMUNICATION SYSTEM EMPLOYING A MULTIDIMENSIONAL CONSTELLATION WITH AN INCREASED MINIMUM DISTANCE

(71) Applicant: Nokia Solutions and Networks OY, Espoo (FI)

(72) Inventors: Juan Ignacio Bonetti, Jauregui (AR); Rene-Jean Essiambre, Red Bank, NJ (US); Muralidharan Kodialam, Malboro, NJ (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 17/025,353

(22) Filed: Sep. 18, 2020

(65) Prior Publication Data

US 2021/0091858 A1  Mar. 25, 2021

Related U.S. Application Data

(60) Provisional application No. 62/903,217, filed on Sep. 20, 2019.

(51) Int. Cl.
*H04B 10/25* (2013.01)
*H04B 10/516* (2013.01)
(Continued)

(52) U.S. Cl.
CPC ......... *H04B 10/5161* (2013.01); *H04B 10/25* (2013.01); *H04B 10/564* (2013.01); *H04B 10/613* (2013.01); *H04J 14/06* (2013.01)

(58) Field of Classification Search
CPC .. H04B 10/25; H04B 10/5161; H04B 10/564; H04B 10/613; H04J 14/06
See application file for complete search history.

(56) References Cited

U.S. PATENT DOCUMENTS

RE40,078 E  2/2008 Dutta et al.
8,792,324 B2  7/2014 Petrov
(Continued)

FOREIGN PATENT DOCUMENTS

JP  2016-144199 A  8/2016

OTHER PUBLICATIONS

Essiambre, René-Jean, et al. "First Transmission of a 12D Format Across 3 Coupled Spatial Modes of a 3-Core Coupled-Core Fiber at a Spectral Efficiency of 4 BITS/S/HZ", 45th European Conference on Optical Communication (ECOC), Sep. 22-26, Dublin, Ireland (2019): 1-4.
(Continued)

*Primary Examiner* — Dzung D Tran
(74) *Attorney, Agent, or Firm* — Mendelsohn Dunleavy, P.C.; Yuri Gruzdkov; Steve Mendelsohn

(57) ABSTRACT

A machine-implemented method of constructing multidimensional constellations having increased minimum distances between the constellation symbols thereof compared to those of comparable conventional constellations, e.g., QPSK and QAM constellations. An example multidimensional constellation so constructed may have eight or more dimensions and may be mapped onto degrees of freedom selected from, e.g., time, space, wavelength, polarization, and the in-phase and quadrature-phase components, of the optical field. The disclosed method is beneficially used to generate multidimensional modulation formats characterized by constant total optical transmit power per modulation time slot and/or applicable to the transmission of multidimensional constellation symbols having separate parts thereof primarily carried by different respective guided modes of the optical fiber. Example methods and apparatus for implementing such multidimensional modulation formats are also disclosed herein.

18 Claims, 10 Drawing Sheets

(51) Int. Cl.
H04J 14/06 (2006.01)
H04B 10/564 (2013.01)
H04B 10/61 (2013.01)

(56) References Cited

U.S. PATENT DOCUMENTS

| | | | |
|---|---|---|---|
| 9,584,259 | B2 | 2/2017 | Millar et al. |
| 9,621,275 | B2 | 4/2017 | Kojima et al. |
| 9,806,739 | B1 | 10/2017 | Kojima et al. |
| 10,320,486 | B1* | 6/2019 | Kojima .................. H04L 27/36 |
| 10,601,521 | B2 | 3/2020 | Essiambre et al. |
| 2011/0085624 | A1 | 4/2011 | Djordjevic et al. |
| 2012/0263466 | A1 | 10/2012 | Djordjevic et al. |
| 2013/0177306 | A1 | 7/2013 | Pfau |
| 2013/0336649 | A1 | 12/2013 | Essiambre et al. |
| 2015/0046765 | A1* | 2/2015 | Shinohara ......... H03M 13/2906 714/752 |
| 2015/0095743 | A1 | 4/2015 | Sato |
| 2015/0195045 | A1 | 7/2015 | Zhuge et al. |
| 2016/0006515 | A1 | 1/2016 | Kojima et al. |
| 2017/0250759 | A1* | 8/2017 | Hatae ................. H04B 10/2507 |
| 2018/0269983 | A1 | 9/2018 | Karar et al. |
| 2020/0119840 | A1* | 4/2020 | Ebrahimzad ......... H04B 10/556 |
| 2020/0204264 | A1* | 6/2020 | Bendimerad ...... H04B 10/2557 |

OTHER PUBLICATIONS

Essiambre, René-Jean, et al. "Capacity Limits of Optical Fiber Networks." Journal of Lightwave Technology 28.4 (2010): 662-701.
Viazovska, Maryna S. "The sphere packing problem in dimension 8." Annals of Mathematics 185 (2017): 991-1015.
Lotz, T. H., et al. "Coded PDM-OFDM Transmission With Shaped 256-Iterative-Polar-Modulation Achieving 11.15-b/s/Hz Intrachannel Spectral Efficiency and 800-km Reach." Journal of Lightwave Technology 31.4 (2013): 538-545.
Böcherer, Georg, et al., "Bandwidth Efficient and Rate-MatchedLow-Density Parity-Check Coded Modulation." IEEE Transactions on Communications 63.12 (2015): 4651-4665.
Buchali, Fred, et al. "Rate Adaptation and Reach Increase by Probabilistically Shaped 64-QAM:An Experimental Demonstralion." Journal of Lightwave Technology 34.7 (2016): 1599-1609.
Cho, Junho, et al. "Trans-atlantic field trial using probabilistically shaped 64-QAM at high spectral efficiencies and single-carrier real-time 250-GB/s 16-QAM." 2017 Optical Fiber Communications Conference and Exhibition (OFC). IEEE, 2017.
Shiner, A. D., et al. "Demonslalion of an 8-dimensional modulation format with reduced inter-channel nonlinearities in a polarization multiplexed coherent system." Optics Express 22.17 (2014): 20366-20374.
Chen, Bin, et al. "Polarization-Ring-Switching for Nonlinearity-Tolerant Geometrically Shaped Four-Dimensional Formats Maximizing Generalized Mutual Information." Journal of Lightwave Technology 37.14 (2019): 3579-3591.
Kojima, Keisuke, et al. "Constant modulus 4D optimized constellation alternative for DP-8QAM." The European Conference on Optical Communication (ECOC), IEEE, Cannes, France (2014): 1-3.
Kojima, Keisuke, et al. "Nonlinearity-tolerant four-dimensional 2A8PSK family for 5-7 bits/symbol spectral efficiency." Journal of Lightwave Technology 35.8 (2017): 1383-1391.
Van Der Heide, Sjoerd, et al. "11,700 km Transmission at 4.8 bit/4D-sym via Four-dimensional Geometrically-shaped Polarization-Ring-Switching Modulation." 24th OptoElectronics and Communications Conference (OECC) and 2019 International Conference on Photonics in Switching and Computing (PSC). IEEE, Fukuoka, Japan (2019): 1-3.
Bülow, Henning, et al. "Coded Modulation of Polarization—and Space-Multiplexed Signals." Asia Communications and Photonics Conference and Exhibition. Optical Society of America, Shanghai, China (2011): 83090W, 3 pages.
Rademacher, G., et al. "Experimental Investigation of a 16-Dimensional Modulation Format for Long-Haul Multi-Core Fiber Transmission." European Conference on Optical Communication (ECOC). IEEE, Valencia, Spain, paper 458 (2015): 1-3.
Ryf, Roland, et al. "Space-division multiplexed transmission over 4200-km 3-core microstructured fiber." National Fiber Optic Engineers Conference. Optical Society of America, Los Angeles, USA, paper paper PDP5C.2 (2012): 1-3.
Cai, J-X., et al. "70.4 Tb/s Capacity over 7,600 km in C+L Band Using Coded Modulation with Hybrid Constellation Shaping and Nonlinearity Compensation." Optical Fiber Communication Conference, Optical Society of America, (2017): Th5B.2 (2 pages).
Conway, J.H., et al., "Sphere Packings, Lattices and Groups.", vol. 290. Springer Science & Business Media, (2013): pp. 1-706.
Geller, Omri, et al. "A Shaping Algorithm for Mitigating Inter-Channel Nonlinear Phase-Noise in Nonlinear Fiber Systems." Journal of Lightwave Technology 34.16 (2016): 3884-3889.
Ghazisaeidi, Amirhossein, et al. "Advanced C+L-band transoceanic transmission systems based on probabilistically shaped PDM-64QAM." Journal of Lightwave Technology 35.7 (2017): 1291-1299.
Pfau, Timo, et al., "Optimization of 16-ary Quadrature Amplitude Modulation Constellations for Phase Noise Impaired Channels." 37th European Conference and Exhibition on Optical Communication. IEEE, Geneva (2011): Tu.3.A.6, 3 pages.
C.E. Shannon, "Probability of Error for Optimal Codes in a Gaussian Channel," The Bell System Technical Journal, vol. 38, No. 3, pp. 611-633, May 1959.
C.E. Shannon, "Probability of Error for Optimal Codes in a Gaussian Channel," The Bell System Technical Journal, vol. 38, No. 3, pp. 634-656, May 1959.
T.M. Cover and J.A. Thomas, Elements of Information Theory, 2nd Edition., John Wiley & Sons, Inc., 1991, cover page, Wiley Series in Communications p. Authors/Publisher p. copyright p. dedication p. vii-x, xi-xii, xii-xviii, xix-xxii,title page, pp. 1-72.
T.M. Cover and J.A. Thomas, Elements of Information Theory, 2nd Edition., John Wiley & Sons, Inc., 1991, cover page, Wiley Series in Communications p. Authors/Publisher p. copyright p. dedication p. vii-x, xi-xii, xii-xviii, xix-xxii,title page, pp. 73-166.
T.M. Cover and J.A. Thomas, Elements of Information Theory, 2nd Edition., John Wiley & Sons, Inc., 1991, cover page, Wiley Series in Communications p. Authors/Publisher p. copyright p. dedication p. vii-x, xi-xii, xii-xviii, xix-xxii,title page, pp. 167-261.
T.M. Cover and J.A. Thomas, Elements of Information Theory, 2nd Edition., John Wiley & Sons, Inc., 1991, cover page, Wiley Series in Communications p. Authors/Publisher p. copyright p. dedication p. vii-x, xi-xii, xii-xviii, xix-xxii,title page, pp. 262-356.
T.M. Cover and J.A. Thomas, Elements of Information Theory, 2nd Edition., John Wiley & Sons, Inc., 1991, cover page, Wiley Series in Communications p. Authors/Publisher p. copyright p. dedication p. vii-x, xi-xii, xii-xviii, xix-xxii,title page, pp. 357-450.
T.M. Cover and J.A. Thomas, Elements of Information Theory, 2nd Edition., John Wiley & Sons, Inc., 1991, cover page, Wiley Series in Communications p. Authors/Publisher p. copyright p. dedication p. vii-x, xi-xii, xii-xviii, xix-xxii,title page, pp. 451-542.
A.D. Ellis, "The nonlinear Shannon limit and the need for new fibres" Nonlinear Optics and Applications VI edited by Benjamin J. Eggleton. Alexander L. Gaeta, Neil G. Broderick, Proc. of SPIE, vol. 8434, 834340H-1, (2012) 10 pages.
Soumya Sunder Dash et al., "Approaching the Shannon limit Through Constellation Modulation", Optical Fiber Communications 2016, OFC 2016, paper TH2A.46, 3 pages.
A.D Ellis et al., "Approaching the Non-linear Shannon limit", Journal of Lightwave Technology 11648-2009.R1, 2009-2010, pp. 1-12.
K. Kojima et al., "Nonlinearity-tolerant Modulation Formats for Coherent Optical Communications", Mitsubishi Electric Research Laboratories, Inc., 2017, InTEch Open Book, doc TR2017-197, 22 pages, Cambridge, MA.
K Kojima et al., "Comparison of nonlinearity tolerance of modulation formats for subcarrier modulation", Optical Fiber Communications Conference, Mar. 11-15, 2018, San Diego, CA , paper M2C 4.pdf, 3 pages.

(56) References Cited

OTHER PUBLICATIONS

Johnny Karout et al., "Achievable Rates of Multidimensional Multisphere Distributions" OFC 2017, Optical Society of America 2017, paperW4A 4.pdf, 3 pages.

Rene-Jean Essiambre et al., "Capacity Limits of Information Transport in Fiber-Optic Networks" Physical Review Letters, vol. 101, Oct. 2008, p. 163901-1 through 163901-4.

Johnny Karout el al, "Achievable Rates of Multidimensional Multisphere Distributions" Presentation at OFC 2017, ppt presentation nokia. pdf, 12 pages.

D. Marcuse et al., "Application of the Manakov-PMD equation to studies of signal propagation in optical fibers with randomly varying birefringence," J. Lightwave Technol., vol. 15, No. 9, pp. 1735-1746, 1997.

A. Mecozzi et al., "Nonlinear propagation in multi-mode fibers in the strong coupling regime," Opt Express, vol. 20, No. 11, pp. 11673-11678, 2012.

S. Mumtaz et al., "Spatially multiplexed transmission in multicore fibers: Role of core coupling on system performance," Opt. Soc A. Frontier in Optics, 2012, 2 pages, paper FW1D.2 pdf.

L-F. Wei. "Trellis-coded modulation with multidimensional constellations," IEEE Trans. Inf. Theory, vol. 33, No. 4, pp. 483-501. 1987.

\* cited by examiner

100

210

220

230

240

250

260

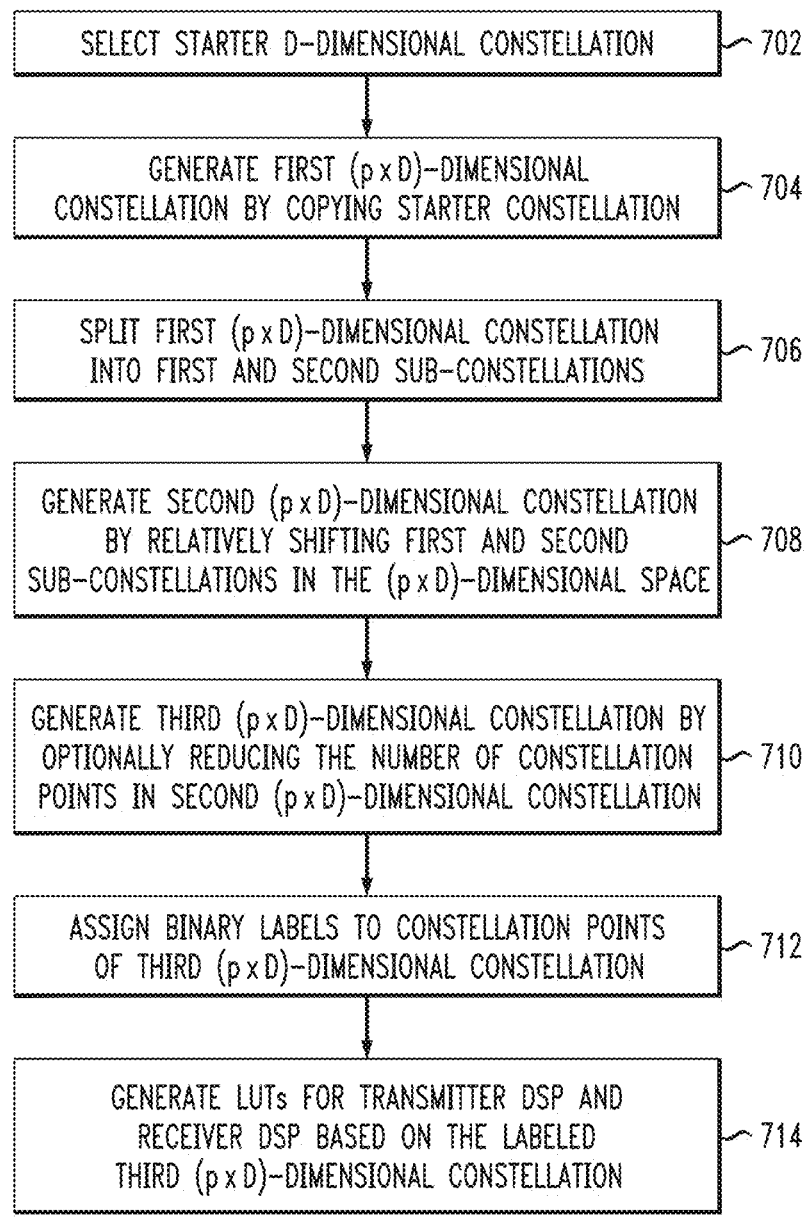

810

830

800

820

OPTICAL COMMUNICATION SYSTEM EMPLOYING A MULTIDIMENSIONAL CONSTELLATION WITH AN INCREASED MINIMUM DISTANCE

CROSS-REFERENCE TO RELATED APPLICATIONS

This application claims the benefit of U.S. Provisional Patent Application No. 62/903,217 filed on 20 Sep. 2019, and entitled "OPTICAL COMMUNICATION SYSTEM EMPLOYING A MULTIDIMENSIONAL CONSTELLATION WITH AN INCREASED MINIMUM DISTANCE," which is incorporated herein by reference in its entirety.

BACKGROUND

Field

Various example embodiments relate to optical communication equipment and, more specifically but not exclusively, to methods and apparatus for transmitting data using modulated optical signals.

Description of the Related Art

This section introduces aspects that may help facilitate a better understanding of the disclosure. Accordingly, the statements of this section are to be read in this light and are not to be understood as admissions about what is in the prior art or what is not in the prior art.

Transmission of optical communication signals over fiber-optic links is usually impaired by a significant amount of noise, such as additive white Gaussian noise (AWGN), and detrimental nonlinear optical effects, such as nonlinear interference noise (NLIN). Such noise and/or nonlinear optical effects can distort optical communication signals en route from an optical data transmitter to the corresponding optical data receiver in a manner that tends to detrimentally affect the bit-error rate (BER), the symbol-error rate (SER), and/or the maximum achievable transmission distance. Therefore, modulation/demodulation schemes that can help to mitigate the detrimental effects of noise and/or nonlinear optical effects are highly desirable.

SUMMARY OF SOME SPECIFIC EMBODIMENTS

Disclosed herein are various embodiments of a machine-implemented method of constructing multidimensional constellations having increased minimum distances between the constellation symbols thereof compared to those of comparable conventional constellations, e.g., Quadrature Phase Shift Keying (QPSK) and Quadrature Amplitude Modulation (QAM) constellations. An example multidimensional constellation so constructed may have eight or more dimensions and may be mapped onto degrees of freedom selected from, e.g., time, space, wavelength/frequency, polarization, and the in-phase (I) and quadrature-phase (Q) components, of the optical field. The disclosed method is beneficially used to generate multidimensional modulation formats characterized by constant total optical transmit power per modulation time slot and/or applicable to the transmission of multidimensional constellation symbols having separate parts thereof primarily carried by different respective guided modes of the optical fiber and/or carried by different respective optical carriers or subcarriers (e.g., OFDM components). Example methods and apparatus for implementing such multidimensional modulation formats are also disclosed herein.

According to an example embodiment, provided is an apparatus, comprising an optical data transmitter including: first and second in-phase and quadrature-phase (IQ) optical modulators; an optical combiner connected to polarization-multiplex output light of the first and second IQ optical modulators; and an electronic controller configured to cause the first IQ optical modulator to modulate first parts of multidimensional constellation symbols onto an optical carrier and to cause the second IQ optical modulator to modulate separate second parts of the multidimensional constellation symbols onto the optical carrier to cause the optical combiner to output about a same total optical power in each of modulation time slots, the first and second parts of each of the multidimensional constellation symbols spanning two or more consecutive ones of the modulation time slots; wherein paired in-phase and quadrature coordinates of each of the first and second parts of the multidimensional constellation symbols have values corresponding to first and second circles in a corresponding complex plane; and wherein the electronic controller is configured to cause at least one of the first and second IQ optical modulators to modulate different sets of the paired in-phase and quadrature coordinates in said consecutive ones of the modulation time slots of each multidimensional constellation symbol.

According to another example embodiment, provided is an apparatus, comprising a coherent optical data receiver including: an optical hybrid configured to mix an optical data signal and an optical local-oscillator signal to generate a respective plurality of mixed optical signals for each of first and second mutually orthogonal polarizations of the optical data signal; a plurality of photodetectors connected to the optical hybrid to convert the mixed optical signals into separate streams of measurements of in-phase and quadrature components of each of said first and second mutually orthogonal polarizations; and a digital signal processor configured to process said separate streams to recover data modulated onto the optical data signal in which a multidimensional modulation symbol spans two or more consecutive modulation time slots, different ones of said consecutive modulation time slots having different parts of the multidimensional modulation symbol; wherein the digital signal processor is further configured to identify a multidimensional constellation symbol corresponding to the multidimensional modulation symbol by comparing the measurements in said consecutive modulation time slots and corresponding sets of values of a constellation; wherein paired in-phase and quadrature coordinates of each of first and second parts of each multidimensional constellation symbol of the constellation have values corresponding to first and second circles in a corresponding complex plane; and wherein at least some sets of the paired in-phase and quadrature coordinates determined based on the multidimensional modulation symbol in said consecutive modulation time slots are different.

According to yet another example embodiment, provided is an apparatus, comprising an optical data transmitter including: a plurality of IQ optical modulators; and an electronic controller configured to operate the IQ optical modulators to optically output a sequence of multidimensional constellation symbols to an end of an optical fiber such that, near the end, each of the multidimensional constellation symbols has separate parts thereof primarily carried by different respective guided modes of the optical fiber, said separate parts forming two or more respective optical signal streams in the optical fiber; and wherein the electronic controller is configured to cause the two or more optical signal streams to be different in at least some modulation time slots.

According to yet another example embodiment, provided is an apparatus, comprising a coherent optical data receiver including: an optical front-end configured to output a plurality of parallel sequences of measurements of different phase and polarization components of two or more optical signal streams each received primarily from a corresponding guided mode of an optical fiber end-coupled to the coherent optical data-receiver; and a digital signal processor configured to determine, from the measurements, a stream of multidimensional constellation symbols having separate parts thereof in the two or more of the optical signal streams; and wherein each of the two or more of the optical signal streams corresponds to a different independent linear combination of the separate parts.

BRIEF DESCRIPTION OF THE DRAWINGS

Other aspects, features, and benefits of various disclosed embodiments will become more fully apparent, by way of example, from the following detailed description and the accompanying drawings, in which:

FIG. 7 shows a flowchart of an example machine-implemented method that can be used to construct a multidimensional constellation for use in the optical communication system of FIG. 1 according to an embodiment;

DETAILED DESCRIPTION

Figure 1:
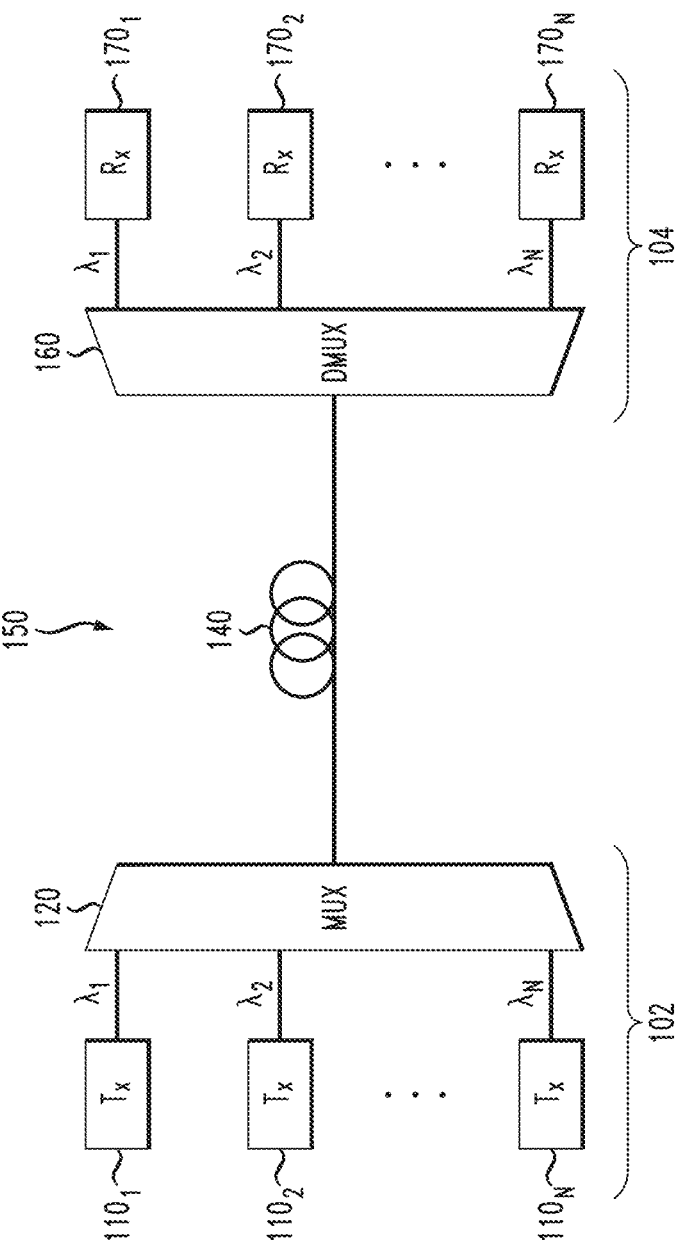
FIG. 1 shows a block diagram of an optical communication system in which at least some embodiments can be practiced.

At least some embodiments disclosed herein can be used to implement optical modulation and/or demodulation schemes yielding better performance characteristics for data transmission over noise-impaired impaired optical channels than comparable conventional modulation/demodulation schemes.

According to an example embodiment, an optical system operates to transmit data using a multidimensional constellation that has been generated using a 2D constellation. Each individual symbol of such a multidimensional constellation may be transmitted to have separate portions thereof on two or more consecutive data-modulation time slots and/or to have separate portions thereof on different lateral spatial propagation modes of the optical fiber span(s).

In some embodiments, the multidimensional constellation has eight or more dimensions.

In some embodiments, at least some of the multiple dimensions of the multidimensional constellation correspond to different respective modulation time slots of the optical data signal.

As used herein, the term "multidimensional" refers to a constellation having more than one dimension. Different dimensions of a multidimensional constellation may correspond to different degrees of freedom of an optical signal. Such degrees of freedom may be selected from, e.g., time, space, wavelength/frequency, polarization, and the in-phase (I) and quadrature-phase (Q) components of the optical field.

In some embodiments, different signaling intervals (modulation time slots) can represent different subsets of dimensions of the multidimensional constellation.

In some embodiments, two mutually orthogonal polarizations of the optical signal can represent two dimensions of a multidimensional constellation.

In some embodiments, different carrier wavelengths can represent different dimensions of the multidimensional constellation.

In some embodiments, different sub-carriers or tones can represent different dimensions of the multidimensional constellation. For example, a multidimensional constellation can be used to generate an orthogonal frequency-division multiplexing (OFDM) signal.

In some embodiments, K different lateral spatial modes of an optical fiber (see, e.g., FIGS. 2B-2F) can represent K different dimensions of the multidimensional constellation, where K is an integer greater than one.

Depending on the embodiment, the I and Q components of the electric field of an optical signal can correspond to one dimension or two dimensions of a multidimensional constellation. For example, an M-ary phase shift keying (M-PSK) constellation characterized by a single (e.g., constant) amplitude value can represent one dimension of the multidimensional constellation, where M is an integer greater than one. Similarly, an M-ary pulse amplitude modulation (M-PAM) constellation can represent one dimension of the multidimensional constellation. In contrast, a rectangular or other suitable nonlinear-shape M-ary quadrature amplitude modulation (M-QAM) constellation characterized by two or more different amplitude values and at least two different phase values can represent two dimensions of the multidimensional constellation.

In an example embodiment, a 12D constellation can be constructed using a rectangular M-QAM constellation (which provides two dimensions) for two orthogonal polarizations (which doubles the number of dimensions), over three time slots (which further multiplies the number of dimensions by three). In an alternative embodiment of a 12D constellation, a single modulation time slot can be used for the transmission of optical signals via the I and Q components of two polarizations of three different cores of a multi-core optical fiber or three orthogonal spatial modes (e.g., three different, mutually non-degenerate $LP_{nm}$ modes) of a multimode optical fiber.

Based on the present disclosure, a person of ordinary skill in the art will understand how to select other sets of degrees of freedom of an optical signal for constructing other multidimensional modulation formats.

As used herein, the term "constellation symbol" should be construed to encompass both constellation symbols of a one-dimensional constellation and of a multidimensional constellation. An example one-dimensional constellation enables transmission of a single constellation symbol in a single signaling interval (modulation time slot) over a single dimension of the optical carrier. In contrast, a multidimensional constellation enables transmission of a single constellation symbol using multiple modulation time slots and/or multiple dimensions of the optical carrier.

As used herein, the term "distance" should be construed to encompass (i) a Euclidean distance between two points in a multidimensional space, and (ii) other types of distance between two points in a multidimensional space, such as, without limitation, a Mahalanobis distance, a Minkowski distance, a Manhattan distance, a Hamming distance, and a Chebyshev distance.

FIG. 1 shows a block diagram of an optical communication system 100 in which at least some embodiments can be practiced. System 100 comprises a wavelength-division-multiplexing (WDM) optical data transmitter 102 and a WDM optical data receiver 104 connected using a fiber-optic link 150. In an example embodiment, link 150 can be implemented using one or more all-optically end-connected spans of optical fiber 140. In addition, link 150 may optionally have one or more optical amplifiers (not explicitly shown in FIG. 1), e.g., each all-optically connected between ends of two respective spans of fiber 140. In some embodiments, link 150 may incorporate additional optical elements (not explicitly shown in FIG. 1), such as optical splitters, combiners, couplers, switches, etc., as known in the pertinent art. In some embodiments, link 150 may not have any optical amplifiers therein.

In an example embodiment, WDM optical data transmitter 102 and WDM optical data receiver 104 are configured to use two or more carrier wavelengths $\lambda_1$-$\lambda_N$. In some embodiments, system 100 can be configured to transport polarization-division-multiplexed (PDM) signals, wherein each of two orthogonal polarizations of each WDM optical channel can be individually modulated. In some such embodiments, each individual data symbol may have parts thereof on both of the two orthogonal polarizations.

In an example embodiment, WDM transmitter 102 comprises N individual optical data transmitters $110_1$-$110_N$, where the number N is an integer greater than one. Each of optical data transmitters 110 uses a different respective carrier wavelength (e.g., one of wavelengths $\lambda_1$-$\lambda_N$, as indicated in FIG. 1) to generate a corresponding modulated optical signal. The individual optical data transmitters $110_1$-$110_N$ may be relatively local or remote. A local or spatially extended wavelength multiplexer (MUX) 120 may then combine (multiplex) the different optical signals generated by optical data transmitters $110_1$-$110_N$, thereby generating the corresponding WDM signal that is applied to link 150 for transmission to WDM optical data receiver 104.

In an example embodiment, WDM optical data receiver 104 comprises a local or spatially extended optical wavelength demultiplexer (DMUX) 160 and N individual optical data receivers $170_1$-$170_N$. DMUX 160 operates to separate (demultiplex) the WDM components of the received optical WDM signal, thereby generating individual optical input signals of carrier wavelengths $\lambda_1$-$\lambda_N$ for the optical data receivers $170_1$-$170_N$, respectively.

In some embodiments, N=1. In such embodiments, MUX 120 and DMUX 160 may not be present.

In some embodiments, system 100 can be adapted for transmission of different optical data streams over different guided spatial modes of optical fiber 140. In such embodiments, optical data transmitters $110_1$-$110_N$ may be configured to use the same carrier wavelength, e.g., $\lambda_1$. Optical data receivers $170_1$-$170_N$ may then be configured to share the same local-oscillator source generating a local-oscillator signal whose wavelength is approximately $\lambda_1$. Wavelength MUX 120 may be replaced by a suitable spatial-mode MUX configured to couple light from different ones of the optical data transmitters $110_1$-$110_N$ primarily into different respective transverse spatial modes of optical fiber 140 at the proximal end thereof. Wavelength DMUX 160 may be replaced by a suitable spatial mode DMUX configured to direct light from different respective transverse spatial modes of optical fiber 140 at the proximal end thereof to different ones of the optical data receivers $170_1$-$170_N$.

FIGS. 2A-2F show (not to scale) cross-sectional views of example optical fibers that can be used to implement fiber-optic link 150 (FIG. 1) according to some example embodiments.

Figure 2A:
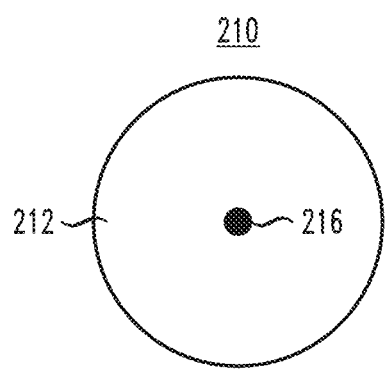
FIGS. 2A-2F show (not to scale) cross-sectional views of example optical fibers that can be used in the optical communication system of FIG. 1 according to some example embodiments.

FIG. 2A shows a cross-sectional view of a single-mode optical fiber 210. Fiber 210 has a cladding 212 and a core 216. Core 216 has a relatively small diameter, which causes fiber 210 to support a single guided mode for each wavelength from the range of wavelengths employed in system 100, e.g., wavelengths $\lambda_1$-$\lambda_N$. Such an optical fiber 210 may be used, e.g., in embodiments for which an individual constellation symbol occupies a plurality of consecutive data-modulation time slots of optical data-modulator(s) of a wavelength channel.

Figure 2B:
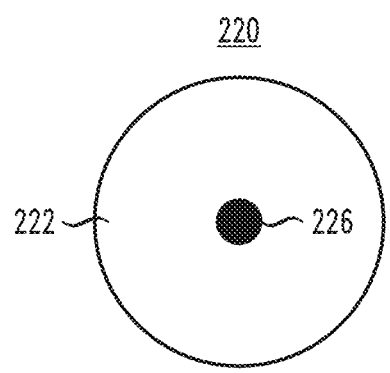

FIG. 2B shows a cross-sectional view of a multimode optical fiber 220. Fiber 220 has a cladding 222 and a core 226. Fiber 220 differs from fiber 210 in that core 226 may have a larger diameter than core 216. In various embodiments, the diameter and/or refractive-index profile of core 226 is chosen to enable fiber 220 to support a desired number (e.g., in the range between two and about one hundred) of guided modes of transverse lateral spatial profile, for one or more of the wavelengths employed in system 100, e.g., wavelengths $\lambda_1$-$\lambda_N$.

Figure 2C:
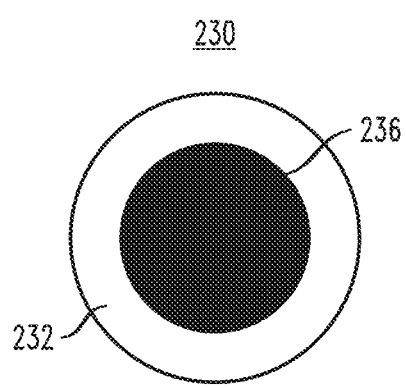

FIG. 2C shows a cross-sectional view of a multimode optical fiber 230. Fiber 230 has a cladding 232 and a core 236. Core 236 has an even larger diameter than core 226, which enables fiber 230 to support more than about one hundred guided modes for the wavelengths employed in system 100, e.g., wavelengths $\lambda_1$-$\lambda_N$.

Figure 2D:
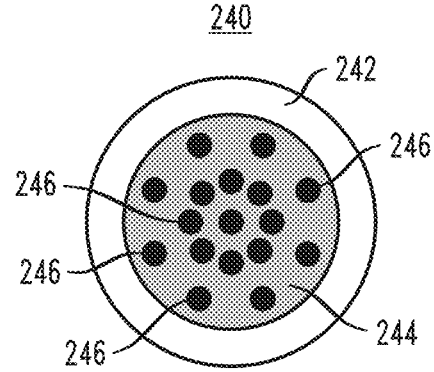

FIG. 2D shows a cross-sectional view of a multi-core optical fiber 240. Fiber 240 has a first (outer) cladding 242 and a second (inner) cladding 244. Fiber 240 further has a plurality of optical cores 246 enclosed within the inner cladding 244. The diameter of each core 246 can be chosen to cause the core to support either a single guided mode or multiple guided modes.

Figure 2E:
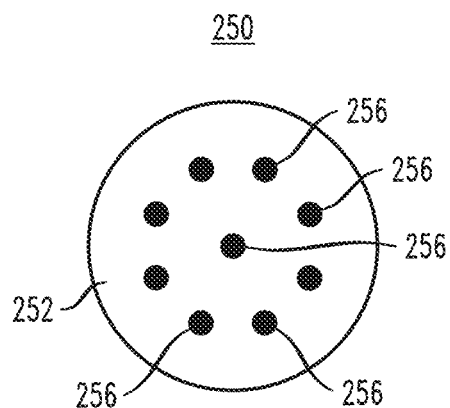

FIG. 2E shows a cross-sectional view of a multi-core optical fiber 250. Fiber 250 has a cladding 252 and a plurality of optical cores 256. Cores 256 are distributed within cladding 252 so that there is a relatively large separation between the cores. Due to the relatively large separation, the amount of inter-core crosstalk in fiber 250 can be relatively small, which enables individual optical cores 256 to function as substantially separate and independent conduits for the corresponding optical communication signals.

Figure 2F:
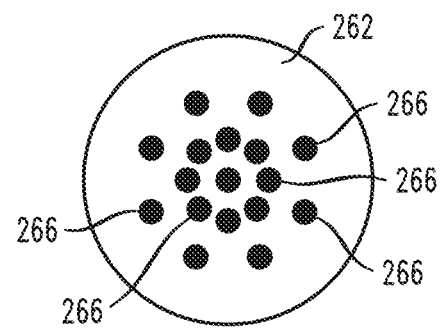

FIG. 2F shows a cross-sectional view of a multi-core optical fiber 260. Fiber 260 has a cladding 262 and a plurality of cores 266. Cores 266 are distributed within cladding 262 so that the separation between the cores is: (i) sufficiently small to produce a moderate amount of linear coupling between different optical cores 266 and (ii) yet sufficiently large to produce a relatively small amount of nonlinear coupling between different optical cores 266. If each of optical cores 266 supports a respective single guided mode, then these properties of fiber 260 can be used to create a relatively small number of well-defined and spatially separated transverse modes for the fiber 260 as a whole.

The optical fibers 220, 230, 240, 250, 260 of FIGS. 2B, 2C, 2D, 2E, and/or 2F may be used, e.g., in embodiments, for which each individual constellation symbol has parts thereof on a plurality of different, e.g., relatively orthogonal, lateral spatial, guided modes of the optical fiber 220, 230, 240, 250, or 260.

Figure 3:
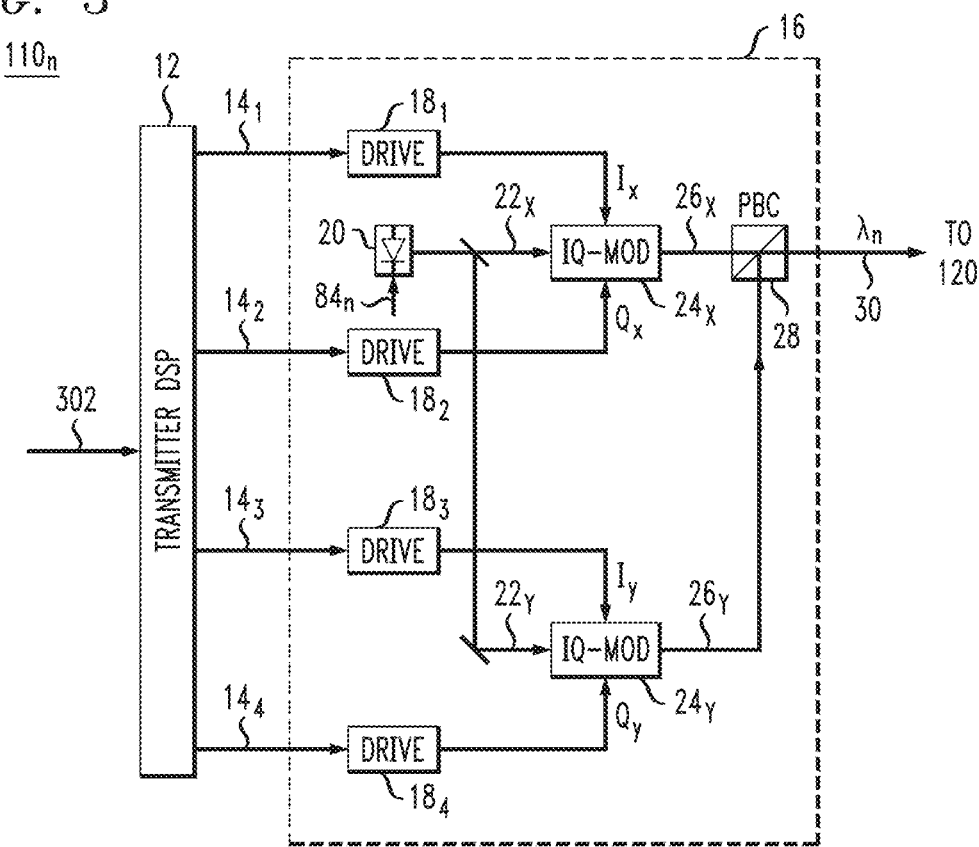
FIG. 3 shows a block diagram of an optical data transmitter that can be used in the optical communication system of FIG. 1 according to an embodiment.

FIG. 3 shows a block diagram of an optical data transmitter $110_n$ that can be used in system 100 (FIG. 1) according to an embodiment, where n=1, 2, . . . , N.

In operation, transmitter $110_n$ receives a digital electrical input stream 302 of payload data and applies said stream to a digital signal processor (DSP) 12. DSP 12 processes input data stream 302 to generate digital signals $14_1$-$14_4$. In an example embodiment, DSP 12 may perform, inter alia, one or more of the following: (i) encode input data stream 302 using a suitable code, e.g., to prevent error propagation and enable error correction at receiver 190; (ii) parse the resulting encoded data stream into a sequence of bit-words; (iii) for each bit-word, determine a corresponding constellation symbol of the operative multidimensional constellation; (iv) use the determined constellation symbol of the multidimensional constellation to determine a corresponding set of one ore more constituent sub-constellations for transmission using the corresponding degrees of freedom of an optical output signal 30. For example, in each modulation time slot corresponding to the constellation symbol of the operative multidimensional constellation, signals $14_1$ and $14_2$ may carry digital values that represent the I component and Q component, respectively, of a corresponding two-dimensional (e.g., M-QAM) constellation symbol intended for transmission using a first (e.g., X) polarization of light. Signals $14_3$ and $14_4$ may similarly carry digital values that represent the I and Q components, respectively, of the corresponding two-dimensional (e.g., M-QAM) constellation symbol intended for transmission using a second (e.g., Y) polarization of light.

An E/O converter (or optical front end, OFE) 16 operates to transform digital signals $14_1$-$14_4$ into the corresponding modulated optical output signal 30. More specifically, drive circuits $18_1$ and $18_2$ transform digital signals $14_1$ and $14_2$, as known in the pertinent art, into electrical analog drive signals $I_X$ and $Q_X$, respectively. Drive signals $I_X$ and $Q_X$ are then used, in a conventional manner, to drive an optical I-Q modulator $24_X$. In response to drive signals $I_X$ and $Q_X$, optical I-Q modulator $24_X$ operates to modulate an X-polarized beam $22_X$ of light supplied thereto by a laser source 20 as indicated in FIG. 3, thereby generating a modulated optical signal $26_X$.

The output wavelength of laser source 20 is wavelength $\lambda_n$. The optical output power of laser source 20 can be set and/or changed in response to a control signal $84_n$.

Drive circuits $18_3$ and $18_4$ similarly transform digital signals $14_3$ and $14_4$ into electrical analog drive signals $I_Y$ and $Q_Y$, respectively. In response to drive signals $I_Y$ and $Q_Y$, an optical I-Q modulator $24_Y$ operates to modulate a Y-polarized beam $22_Y$ of light supplied by laser source 20 as indicated in FIG. 3, thereby generating a modulated optical signal $26_Y$. A polarization beam combiner (PBC) 28 operates to combine modulated optical signals $26_X$ and $26_Y$, thereby generating the optical output signal 30, said optical output signal being a polarization-division-multiplexed (PDM) signal. Optical output signal 30 may then be directed for transmission to the optical fiber 140, e.g., via wavelength MUX 120, i.e., if optical data transmitter 102 transmits in multiple optical wavelength channels (also see FIG. 1).

In some embodiments, functions of DSP 12 can be performed by a DSP shared by different optical data transmitters $110_n$ of system 100.

Figure 4:
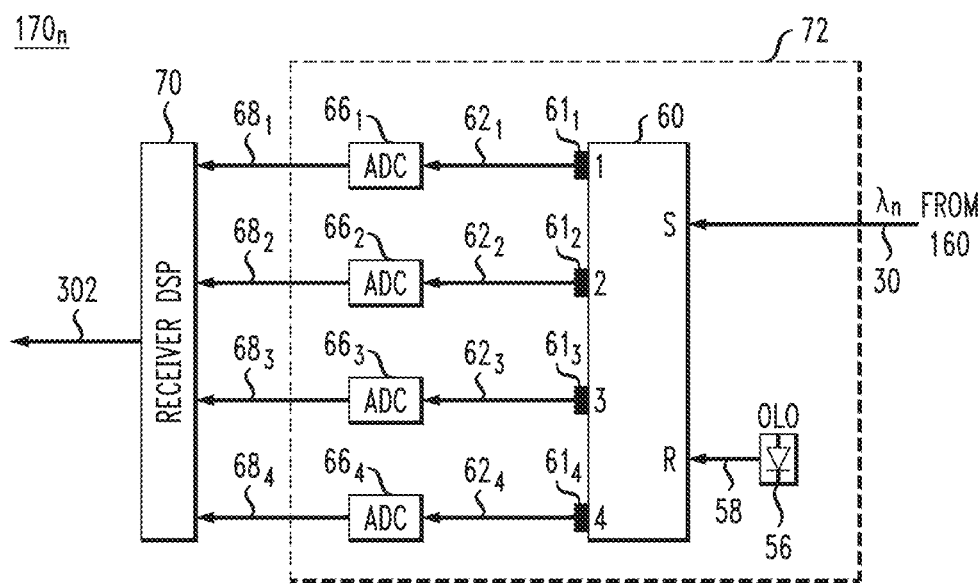
FIG. 4 shows a block diagram of an optical data receiver that can be used in the optical communication system of FIG. 1 according to an embodiment.

FIG. 4 shows a block diagram of an optical data receiver $170_n$ that can be used in system 100 (FIG. 1) according to an embodiment.

An optical front end (or O/E converter) 72 of receiver $170_n$ comprises an optical hybrid 60, light detectors $61_1$-$61_4$, analog-to-digital converters (ADCs) $66_1$-$66_4$, and an optical local-oscillator (OLO) source 56. Optical hybrid 60 has (i) two input ports labeled S and R and (ii) four output ports labeled 1 through 4. Input port S receives an optical signal 30 from wavelength DMUX 160. Input port R receives an OLO signal 58 generated by OLO source (e.g., laser) 56. OLO signal 58 has an optical-carrier wavelength (frequency) that is sufficiently close to that of signal 30 to enable coherent (e.g., intradyne) detection of the latter optical signal.

In an example embodiment, optical hybrid 60 operates to mix optical signal 30 and OLO signal 58 to generate different mixed (e.g., by interference) optical signals (not explicitly shown in FIG. 4). Light detectors $61_1$-$61_4$ then convert the mixed optical signals into four electrical signals $62_1$-$62_4$ that are indicative of complex values corresponding to two orthogonal-polarization components of optical signal 30. For example, electrical signals $62_1$ and $62_2$ may be indicative of an analog I signal and an analog Q signal, respectively, or linearly independent mixtures thereof corresponding to a first (e.g., horizontal, h) polarization component of optical signal 30. Electrical signals $62_3$ and $62_4$ may similarly be indicative of an analog I signal and an analog Q signal, respectively, or linearly independent mixtures thereof corresponding to a second (e.g., vertical, v) polarization component of optical signal 30. Note that the orientation of the h and v polarization axes at receiver $170_n$ may not coincide with the orientation of the X and Y polarization axes at transmitter $110_n$.

Each of electrical signals $62_1$-$62_4$ is converted into digital form in a corresponding one of ADCs $66_1$-$66_4$. Optionally, each of electrical signals $62_1$-$62_4$ may be low-pass filtered and amplified in a corresponding electrical amplifier (not explicitly shown) prior to the resulting signal being converted into digital form. Digital signals $68_1$-$68_4$ produced by ADCs $66_1$-$66_4$, respectively, are then processed by a DSP 70 to recover the data of the original input data stream 302 applied to transmitter $110_n$.

In an example embodiment, DSP 70 may perform, inter alia, one or more of the following: (i) signal processing directed at dispersion compensation; (ii) signal processing directed at compensation of nonlinear distortions; (iii) electronic compensation for polarization rotation and polarization de-multiplexing; (iv) compensation of frequency offset between OLO 56 of optical receiver $170_n$ and laser source 20 of optical transmitter $110_n$; (v) error correction based on the data encoding (if any) applied at DSP 12; (vi) mapping of a set of complex values conveyed by digital signals $68_1$-$68_4$ onto the operative multidimensional constellation to determine a corresponding constellation symbol thereof; and (vii) concatenating the binary labels (bit-words) of the constellation symbols determined through said mapping to reconstruct data stream 302.

In some embodiments, functions of DSP 70 can be performed by a DSP shared by different optical data receivers $170_n$ of system 100.

Figure 5:
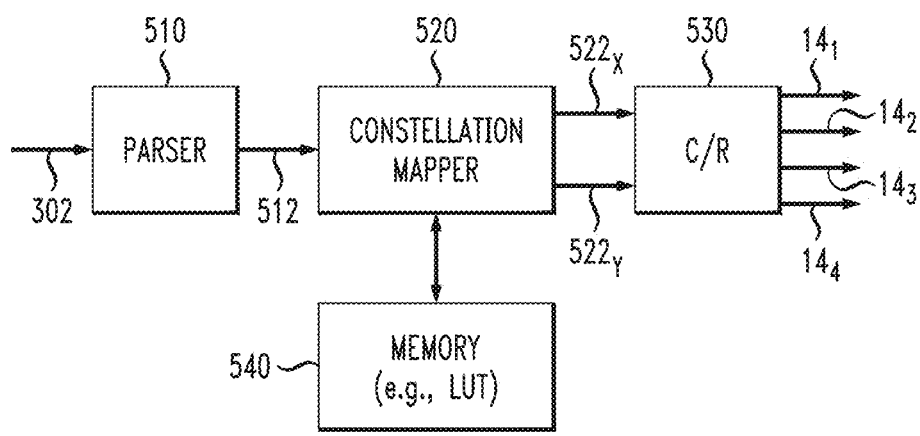
FIG. 5 shows a block diagram of a digital circuit that can be used in the optical data transmitter of FIG. 3 according to an embodiment.

FIG. 5 shows a block diagram of a digital circuit 500 that can be used in transmitter DSP 12 according to an example embodiment. Example use of digital signals 302 and $14_1$-$14_4$ in digital circuit 500 is explicitly shown in FIG. 5 to better illustrate the relationship between the circuits shown in FIGS. 3 and 5.

A parser 510 operates to convert bitstream 302 into a stream of bit-words 512. Each of bit-words 512 has the same length (number of bits) as the binary labels of the individual constellation points of the operative multidimensional constellation. In some embodiments, in addition to a simple parsing operation, parser 510 may be configured to perform some additional processing of bitstream 302, such as error-protection coding, interleaving, etc., prior to generating the corresponding bit-words 512.

A constellation mapper 520 operates to convert each bit-word 512 into a corresponding set of complex values for complex-valued digital signals $522_X$ and $522_Y$ using the operative multidimensional constellation. In an example embodiment, the conversion can be performed using a look-up table (LUT) stored in a memory 540, wherein each bit-word value is paired with a corresponding set of complex values. For example, if the operative multidimensional constellation has k signaling intervals as dimensions thereof, then constellation mapper 520 outputs k complex values for digital signal $522_X$ and another k complex values for digital signal $522_Y$ in response to each bit-word 512.

A complex-to-real (C/R) converter 530 operates to convert the complex values of digital signals $522_X$ and $522_Y$ into the corresponding streams of real values. For example, the real parts of the complex values carried by digital signal $522_X$ are outputted via digital signal $14_1$. The imaginary parts of the complex values carried by digital signal $522_X$ are outputted via digital signal $14_2$. The real parts of the complex values carried by digital signal $522_Y$ are outputted via digital signal $14_3$. The imaginary parts of the complex values carried by digital signal $522_Y$ are outputted via digital signal $14_4$. Digital signals $14_1$-$14_4$ are then used to drive the optical front end 16 as explained in reference to FIG. 3.

Figure 6:
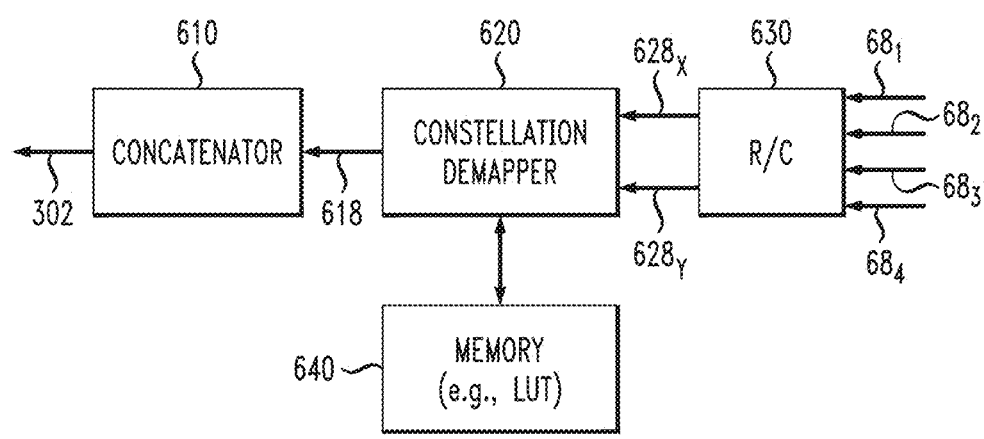
FIG. 6 shows a block diagram of a digital circuit that can be used in the optical data receiver according to an embodiment.

FIG. 6 shows a block diagram of a digital circuit 600 that can be used in receiver DSP 70 according to an example embodiment. Example use of digital signals 302 and $68_1$-$68_4$ in digital circuit 600 is explicitly shown in FIG. 6 to better illustrate the relationship between the circuits shown in FIGS. 4 and 6.

A real-to-complex (R/C) converter 630 operates to convert digital signals $68_1$-$68_4$ into complex-valued digital signals $628_X$ and $628_Y$. For example, a pair of real values supplied by digital signals $68_1$ and $68_2$ can be used as the real part and the imaginary part, respectively, of the corresponding complex value generated by R/C converter 630 for digital signal $628_X$. Similarly, a pair of real values supplied by digital signals $68_3$ and $68_4$ can be used as the real part and the imaginary part, respectively, of the corresponding complex value generated by R/C converter 630 for digital signal $628_Y$.

A constellation demapper 620 operates to convert a set of complex values supplied by complex-valued digital signals $628_X$ and $628_Y$ during several consecutive time slots and/or from several lateral spatial modes into a corresponding bit-word 618 using the operative multidimensional constellation. The number of said several time slots and/or modes is the same as the number of signaling intervals and/or modes used to transmit a single constellation symbol by the corresponding transmitter $110_n$. In the absence of errors, the stream of bit-words 618 is the same as the stream of bit-words 512 (FIG. 5).

In an example embodiment, the conversion performed by constellation demapper 620 can be implemented using a look-up table (LUT) stored in a memory 640, wherein each bit-word value is paired with the set of coordinates of the corresponding constellation point in the multidimensional space of the operative multidimensional constellation. Example demapping steps performed by constellation demapper 620 may include: (i) using the set of complex values supplied by complex-valued digital signals $628_X$ and $628_Y$ to determine coordinates of the corresponding estimated point in the multidimensional space of the operative multidimensional constellation; (ii) finding the constellation point that is located closest to (e.g., having the minimum Hamming or Euclidian distance from) the estimated point in the multidimensional space of the operative multidimensional constellation; (iii) using the LUT of memory 640 to determine the binary label of the found constellation point; and (iv) outputting the determined binary label as a next bit-word of the stream of bit-words 618.

A concatenator 610 operates to recover bitstream 302 from the stream of bit-words 618. In an example embodiment, the operation performed by concatenator 610 is an inverse operation with respect to the operation performed by parser 510. As such, in some embodiments, concatenator 610 may be configured to perform some additional processing of the stream of bit-words 618, such as decoding, de-interleaving, etc., to properly recover bitstream 302.

FIG. 7 shows a flowchart of a machine-implemented method 700 that can be used to generate an operative multi-dimensional constellation for use in system 100 according to an embodiment. For example, appropriate numerical parameters of the generated multidimensional constellation can be loaded into the LUTs of memories 540 and 640 to enable the use of said multidimensional constellation in optical data transmitter $110_n$ and the corresponding optical data receiver $170_n$.

Method 700 begins at step 702, in which a starter $D_0$-dimensional constellation is selected. For example, a four-dimensional starter constellation ($D_0$=4) may be a constellation having parts of a symbol on two orthogonal polarizations (e.g., X and Y), with each of the polarizations being modulated using a conventional M-QAM, i.e., each such part of the symbol belongs to an M-QAM. The two orthogonal polarizations and the I and Q components of the optical field provide the four dimensions of this starter constellation.

At step 704, the starter $D_0$-dimensional constellation is repeated in each of p $D_0$-dimensional subspaces, and the p copies are arranged in different parts (e.g., different dimensions) of a ($p \times D_0$)-dimensional space to form a first ($p \times D_0$)-dimensional constellation.

For example, three consecutive time slots can be used to each implement a $D_0$-dimensional portion of the $3D_0$-dimensional constellation. In this example, p=3. For the above-mentioned example of the M-QAM constellation and two orthogonal polarizations, the resulting $3D_0$-dimensional constellation has $M^6$ constellation points.

In another example, three different spatial modes of optical fiber 220 (FIG. 2B) can be used as three portions of a 12-dimensional constellation. In this particular example, p=3 and $D_0$=4, for p×$D_0$=12.

At step 706, the first (p×$D_0$)-dimensional constellation of step 704 is split into first and second sub-constellations. The split is performed such that each of the first and second sub-constellations has a larger minimum distance between the constellation points thereof than the first (p×$D_0$)-dimensional constellation of step 704. An example of such split is described below in reference to FIG. 8D.

At step 708, the first and second sub-constellations are shifted with respect to one another in the (p×$D_0$)-dimensional space to form a second (p×$D_0$)-dimensional constellation. The relative shift is performed such as to increase the minimum distance between the constellation points belonging to different sub-constellations. Depending on the embodiment, the relative shift of the first and second sub-constellations can be implemented using (i) translation in the (p×$D_0$)-dimensional space; (ii) rotation in the (p×$D_0$)-dimensional space; and (iii) some combination of such translation(s) and/or rotation(s).

In some embodiments, the shifted first and second sub-constellations may be used to provide the parts of the final (i.e., third) (p×$D_0$)-dimensional constellation used for generating data symbols in alternating modulation time slots.

At step 710, the second (p×$D_0$)-dimensional constellation generated at step 708 may be punctured to reduce the number of constellation points therein, i.e., some of the constellation points are deleted. The puncturing may be performed, e.g., such that the resulting third (p×$D_0$)-dimensional constellation has a further increased minimum distance between the constellation points thereof compared to the second (p×$D_0$)-dimensional constellation, i.e., produced at step 708.

In some embodiments, the puncturing may be performed at step 710 such that the total number of constellation points in the resulting third (p×$D_0$)-dimensional constellation is $2^m$, where m is a positive integer. As a result, each constellation point therein can be assigned a different respective binary label having m bits. In an example embodiment, m>4.

In some embodiments, step 710 may be optional, and as such may not be performed.

At step 712, the constellation points of the third (p×$D_0$)-dimensional constellation are assigned different binary labels of an appropriate length. For example, a constellation having $2^m$ constellation points may use m-bit binary labels, as indicated above. A preferred type of constellation-point labeling is such that (i) the Hamming distance between two constellation points is directly related to (e.g., strongly correlated with) the Euclidean distance between the constellation points in the (p×$D_0$)-dimensional space and (ii) the bit-words assigned to two neighboring constellation points differ from one another in several (e.g., at least two) bits.

At step 714, the labeled third (p×$D_0$)-dimensional constellation generated at step 712 is used to generate the LUTs for memories 540 and 640.

FIGS. 8A-8E graphically illustrate certain steps of method 700 according to an embodiment.

Figure 8B:
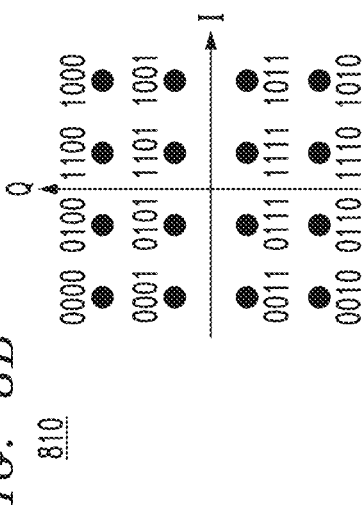
FIGS. 8A-8E graphically illustrate certain steps of the example machine-implemented method of FIG. 7 according to an embodiment.
Figure 8E:
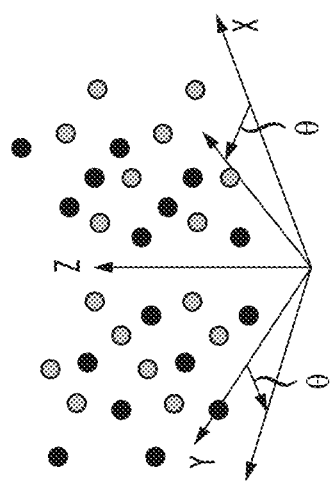
Figure 8A:
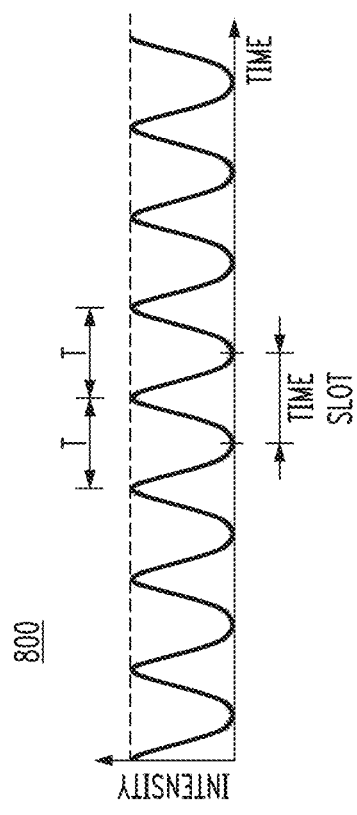

FIG. 8A graphically shows an optical pulse train 800 that can be generated at the corresponding optical data transmitter for further modulation therein. Optical pulse train 800 is periodic with a period T and has one optical pulse per each modulation time slot of duration T, as indicated in FIG. 8A.

FIG. 8B graphically shows a 16-QAM constellation 810. Constellation 810 is a two-dimensional constellation, with the dimensions thereof being the I and Q components of the corresponding optical signal. In an example embodiment, constellation 810 can be selected at step 702 of method 700 as the starter two-dimensional constellation (i.e., $D_0$=2). For illustration purposes, FIG. 8B also shows the 4-bit bit-words (binary labels) that may be assigned to different constellation points of constellation 810. Depending on the embodiment, these binary labels may or may not be used at step 712 of method 700.

Figure 8D:
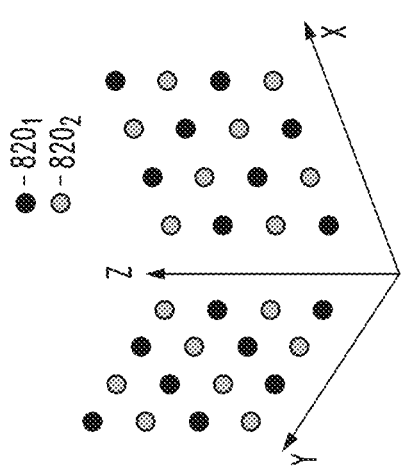
Figure 8C:
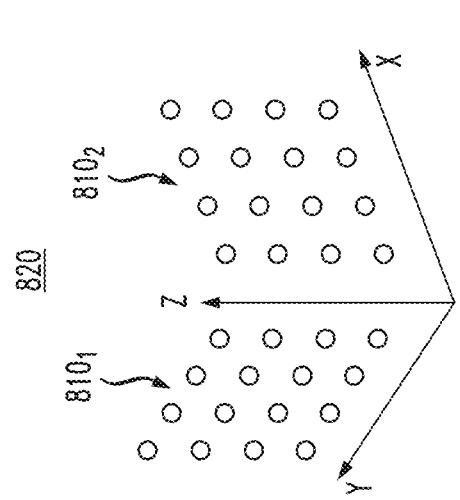

FIG. 8C graphically illustrates step 704 of method 700 for p=2, i.e., when two pulses of optical pulse train 800 are used to provide additional dimensions to the I and Q dimensions of constellation 810. In this particular case, p×$D_0$=4. As an example, a first copy of constellation 810 (labeled $810_1$) is shown as having been placed into a YZ plane of the corresponding four-dimensional space, and a second copy of constellation 810 (labeled $810_2$) is shown as having been placed into an XZ plane of the corresponding four-dimensional space. A resulting arrangement 820 of constellations $810_1$ and $810_2$ provides an example of the first (p×$D_0$)-dimensional constellation referred to above, in the description of method 700.

FIG. 8D graphically illustrates step 706 of method 700, in which constellation 820 of FIG. 8C is split into first and second sub-constellations, labeled $820_1$ and $820_2$, respectively. Note that each of the sub-constellations $820_1$ and $820_2$ has a larger minimum distance between the constellation points thereof than constellation 820 of FIG. 8C. In the shown example, the split increases the minimum distance by a factor of $\sqrt{2}$.

FIG. 8E graphically illustrates step 708 of method 700, in which the sub-constellation $820_1$ is rotated by an angle θ with respect to the sub-constellation $820_2$, which remains in the same position as that shown in FIG. 8D. For illustration purposes and without any implied limitations, this rotation is shown in FIG. 8E as being a rotation about the Z-axis. In general, the relative rotation can be performed about any selected rotation axis in the corresponding four-dimensional space (i.e., the space corresponding to p×$D_0$=4). A resulting arrangement 830 of constellation points after the rotation provides an example of the second (p×$D_0$)-dimensional constellation referred to above, in the description of method 700.

Since the number of constellation points in constellation 830 is $32=2^5$ (i.e., m=5), step 710 of method 700 can be omitted.

In an example embodiment, step 712 of method 700 can then be performed by adding an extra bit to the binary labels shown in FIG. 8B. For example, the binary labels of the constellation points originating from sub-constellation $820_1$ may have a binary "zero" pre-pended thereto at the most-significant-bit (MSB) position, and the binary labels of the constellation points originating from sub-constellation $820_2$ may have a binary "one" pre-pended thereto at the MSB position. A person of ordinary skill in the art will understand that alternative implementations of step 712 are also possible, depending on the angle θ and orientation of the chosen rotation axis in the four-dimensional space.

In some embodiments, method 700 can be applied to Cartesian-grid constellations.

An example D-dimensional Cartesian-grid can mathematically be defined as:

$$\chi = \alpha(x^{(1)}, x^{(2)}, x^{(3)}, \ldots, x^{(D)}) \quad (1)$$

where α is the lattice parameter; and each $x^{(d)}$ is an integer from a range of integers, where d=1, 2, . . . , D. The grid defined by Eq. (1) can be used to generate two groups of constellation points, labeled A and B, respectively. The points of group A satisfy Eq. (2):

$$\chi^{(A)} = \alpha(x^{(1)}_{(D)}, x^{(2)}, x^{(3)}, \ldots, x^{(D)}) \forall (-1)^{x^{(1)} + x^{(1)} + \cdots + x^{(1)}} = 1 \quad (2)$$

The points of group B satisfy Eq. (3):

$$\chi^{(B)} = \alpha(x^{(1)}_{(D)}, x^{(2)}, x^{(3)}, \ldots, x^{(D)}) \forall (-1)^{x^{(1)} + x^{(1)} + \cdots + x^{(1)}} = -1 \quad (3)$$

Groups A and B are examples of the first and second sub-constellations that can be generated at step 706 of method 700.

The points of group B can then be shifted in the D-dimensional space to generate group C. The points of group C satisfy Eq. (4):

$$\chi^{(C)} = \alpha(x^{(1)}_{(D)} + f, x^{(2)} + f, x^{(3)} + f, \ldots, x^{(D)} + f) \forall (-1)^{x^{(1)} + x^{(1)} + \cdots} = -1 \quad (4)$$

where f is the shift parameter. A new constellation $\chi^{(MMC)}$ can then be defined by Eq. (5):

$$\chi^{(MMC)} = \chi^{(A)} \cup \chi^{(C)} \quad (5)$$

where MMC stands for "multipartite multidimensional constellation." The constellation $\chi^{(MMC)}$ is an example of the constellation generated at step 708 of method 700.

If the points of the initial constellation corresponding to Eq. (1) are labeled using a conventional Gray-mapping code, then one can calculate the minimum Euclidean distance $d_h$ corresponding to a given Hamming distance h in the constellation $\chi^{(MMC)}$ as follows:

$$d_h = \alpha \sqrt{h(1-f)^2 + (d-h)f^2}, \text{ if } h \text{ is odd} \quad (6a)$$

$$d_h = \alpha \sqrt{h}, \text{ if } h \text{ is even} \quad (6b)$$

Figure 9:
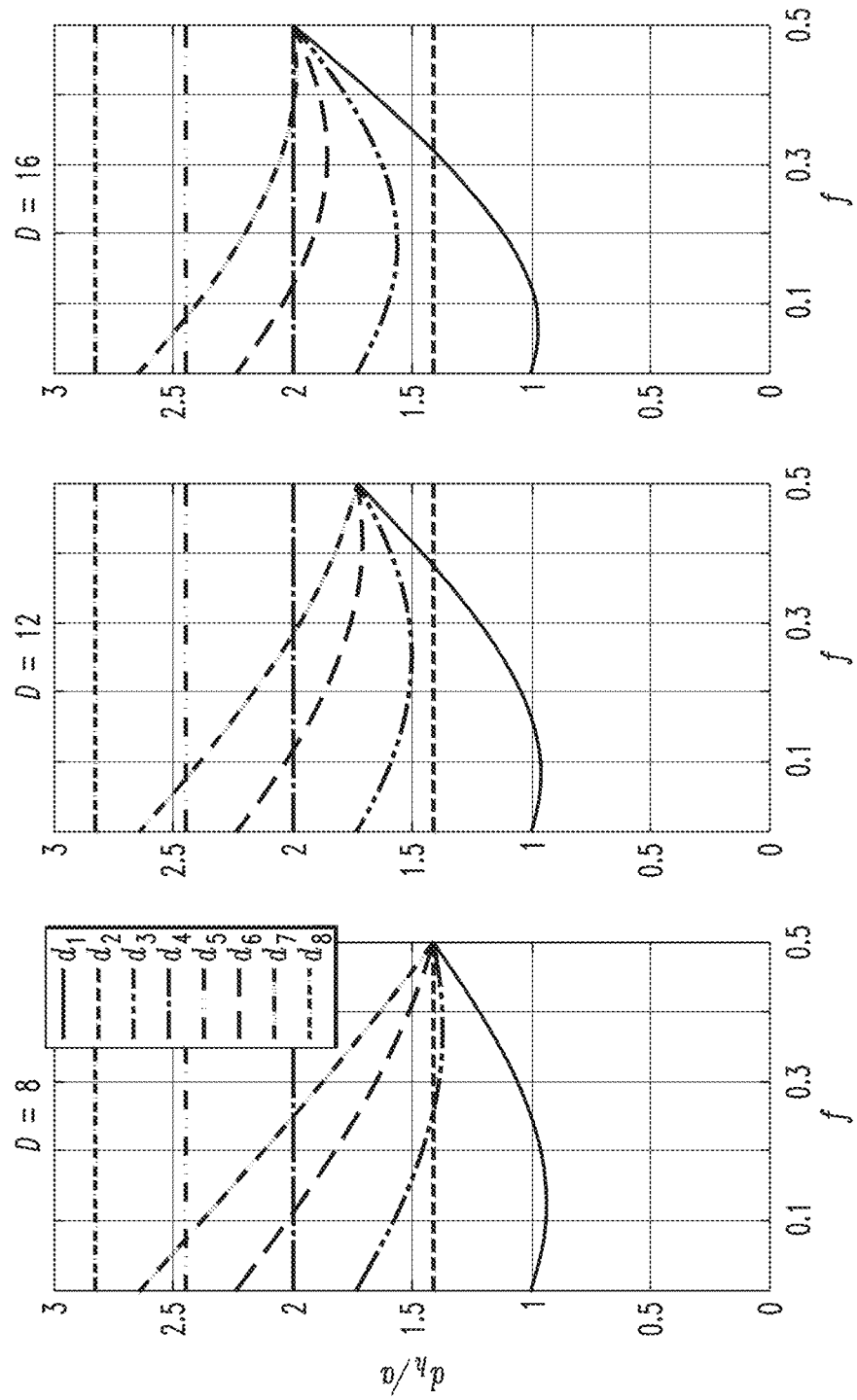
FIG. 9 graphically illustrates possible changes in the minimum distances obtained according to an embodiment of the example machine-implemented method of FIG. 7.

FIG. 9 graphically shows the minimum Euclidean distances $d_h$ calculated as a function of the shift parameter f using Eqs. (6a)-(6b) for different Hamming distances h and three example values of D in Eq. (1), i.e., D=8, 12, and 16. Note that, for f=0, the constellation $\chi^{(MMC)}$ is the same as the initial constellation corresponding to Eq. (1). Further note significant increases of the minimum Euclidean distances $d_1$ for each of the example values of D. For example, for D=8, the minimum Euclidean distance $d_1$ increases by a factor of $\sqrt{2}$ compared to the initial constellation when f=0.5 is chosen. A person of ordinary skill in the art will understand that an increased minimum Euclidean distances $d_1$ may manifest itself as a lower BER observed at the corresponding optical data receiver.

In some embodiments, method 700 can be applied to polar-grid constellations. Polar-grid constellations are important, e.g., for constant-power modulation formats, which are used to better manage nonlinear distortions of transmitted optical signals.

An example polar-grid constellation may have D/2 rings of radius $1/\sqrt{2}$ with N points in each ring, where $N=2^n$ and n is an integer greater than one. This polar-grid constellation can mathematically be defined as:

$$v = \left( \text{Re } x^{(1)}, \text{Im } x^{(1)}, \text{Re } x^{(2)}, \text{Im } x^{(2)}, \ldots, \text{Re } x^{(D/2)}, \text{Im } x^{(D/2)} \right) \quad (7)$$

where

-continued $$x^{(d)} = \frac{1}{\sqrt{2}} \exp\left( 2\pi j \frac{k_d}{N} \right) \quad (8)$$

where $k_d \in [1, N]$. The minimum distance for this constellation can be represented by a fair comparison parameter α defined as:

$$\alpha = \sqrt{2} \cdot \sin\left( \frac{\pi}{N} \right) \quad (9)$$

The polar-grid constellation defined by Eqs. (7)-(8) can be used to generate two groups of constellation points, labeled A and B, respectively. The points of group A satisfy Eq. (10):

$$v^{(A)} = v \forall (-1)^{k_1 + k_2 + \cdots + k_{D/2}} = 1 \quad (10)$$

The points of group B satisfy Eq. (11):

$$v^{(B)} = v \forall (-1)^{k_1 + k_2 + \cdots + k_{D/2}} = -1 \quad (11)$$

Groups A and B are examples of the first and second sub-constellations that can be generated at step 706 of method 700.

The points of group B can then be rotated in the D-dimensional space to generate group C, denoted as $v^{(C)}$. The coordinates of constellation points in group C satisfy Eq. (12):

$$x^{(d)'} = \frac{1}{\sqrt{2}} \exp\left( 2\pi j \frac{k_d + f}{N} \right) \quad (12)$$

where f is the rotation parameter. A new constellation $v^{(MMC)}$ can then be defined by Eq. (13):

$$v^{(MMC)} = v^{(A)} \cup v^{(C)} \quad (13)$$

The constellation $v^{(MMC)}$ is an example of the constellation generated at step 708 of method 700.

If the constellation points of the initial rings corresponding to Eqs. (7)-(8) are labeled using a conventional Gray-mapping code, then one can calculate the minimum distance $d_h$ corresponding to a given Hamming distance h in the constellation $v^{(MMC)}$ as follows:

$$d_h = \alpha \sqrt{2} \times \sqrt{h \cdot \sin^2\left( \frac{\pi(1-f)}{N} \right) + \left( \frac{D}{2} - h \right) \sin^2\left( \frac{\pi f}{N} \right)}, \text{ if } h \text{ is odd} \quad (14a)$$

$$d_h = \alpha \sqrt{h}, \text{ if } h \text{ is even} \quad (14b)$$

where α is defined by Eq. (9).

Figure 10:
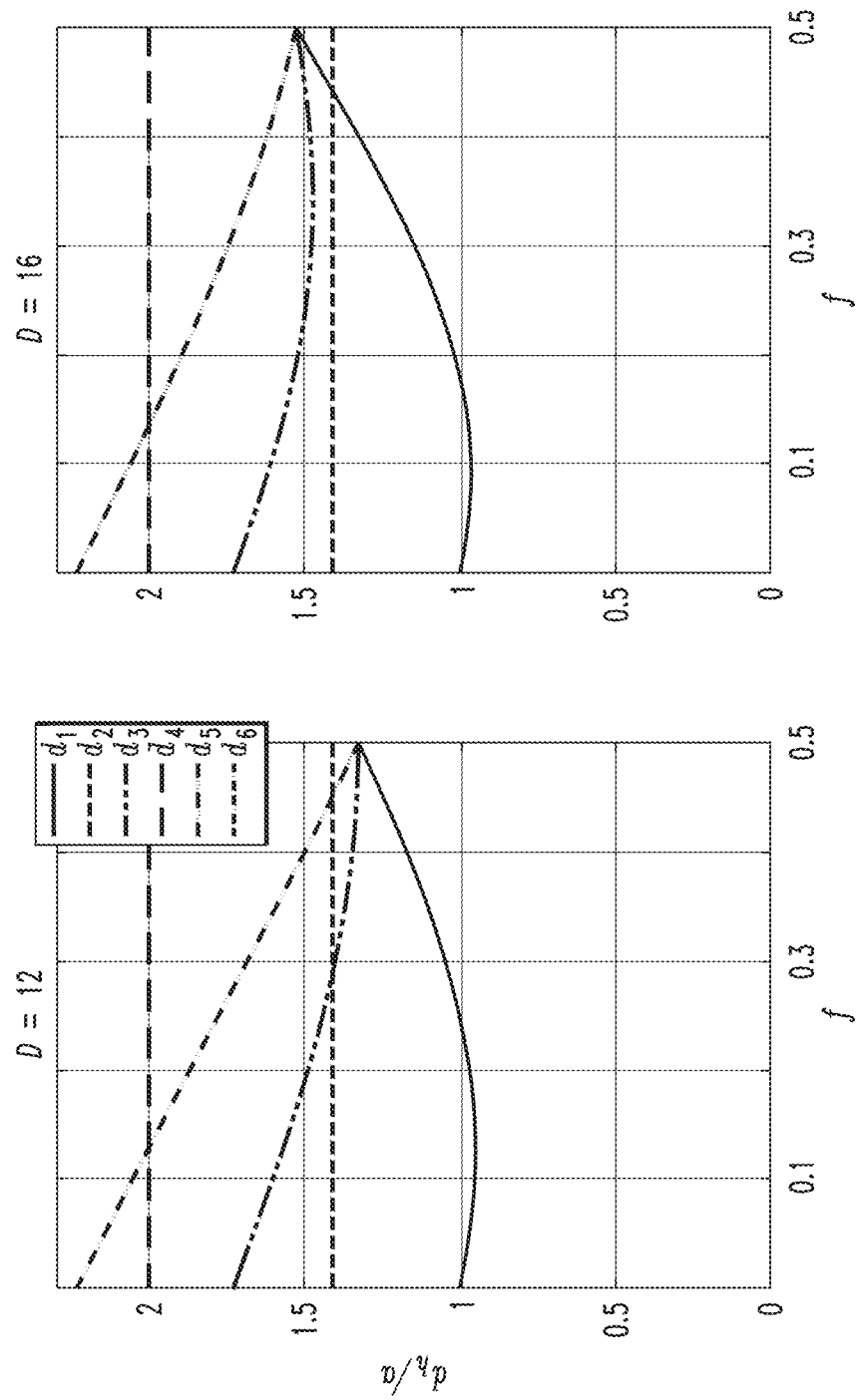
FIG. 10 graphically illustrates possible changes in the minimum distances obtained according to another embodiment of the example machine-implemented method of FIG. 7.

FIG. 10 graphically shows the minimum distances $d_h$ calculated as a function of the rotation parameter f using Eqs. (14a)-(14b) for different Hamming distances h and two example values of D in Eq. (7), i.e., D=12 and 16. The number N of constellation points in each initial ring is N=4, which corresponds to a conventional QPSK constellation. In both examples, significant increases of the minimum distance $d_1$ are evident for the corresponding constellations $v^{(MMC)}$, e.g., for 0.3<f<0.5, compared to the initial constellation, i.e., f=0.

Figure 11:
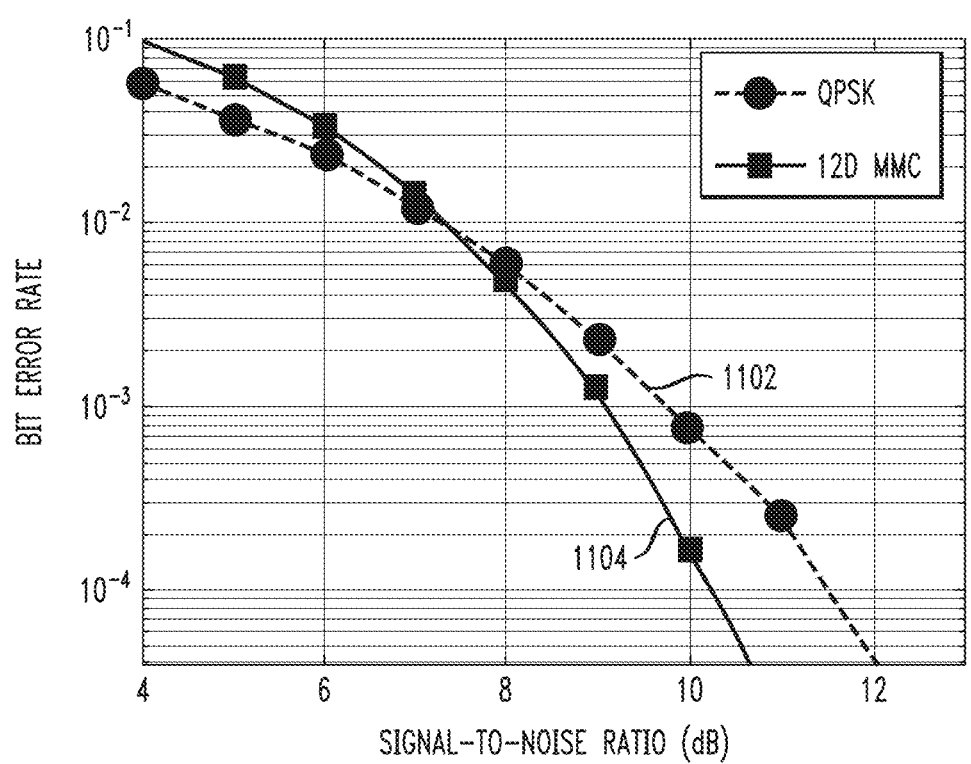
FIG. 11 graphically illustrates possible performance improvements that can be achieved in the optical communication system of FIG. 1 according to an embodiment.

FIG. 11 graphically shows possible performance improvements that can be achieved in system 100 according to an embodiment. More specifically, curves 1102 and 1104 in FIG. 11 graphically show results of experimental BER measurements as a function of the SNR for two different modulation formats in an embodiment of system 100. Curve 1102 corresponds to the conventional QPSK modulation format. Curve 1104 corresponds to a 12D MMC 1100 according to an embodiment (also see FIG. 12). Comparison of curves 1102 and 1104 indicates that the 12D MMC 1100 outperforms conventional QPSK at SNR>7.3 dB, or at BER<9×10$^{-3}$.

In this particular case, 12D MMC 1100 was constructed using method 700, as more specifically outlined in reference to Eqs. (7)-(14). The 12 dimensions (D=12) of the 12D MMC 1100 were mapped onto 12 degrees of freedom of the optical signal provided by: (i) three linearly coupled spatial modes of a three-core coupled-core multi-core optical fiber; (ii) I and Q components of an optical carrier; and (iii) X and Y polarizations of the optical carrier. A single constellation symbol of the 12D MMC 1100 so constructed and mapped occupies a single time slot of a single carrier wavelength. The initial polar grid used in method 700 had six QPSK rings, i.e., N=4 (steps 702, 704; Eq. (8)). The rotation parameter f was selected to be f=0.4 (step 708; Eq. (12)). Step 710 (constellation puncturing) was used to reduce the number of constellation symbols from the unconstrained initial number of $2^{18}$ down to $2^{12}$=4096. Step 712 was then used to assign different 12-bit bit-words to different constellation symbols.

Figure 12:
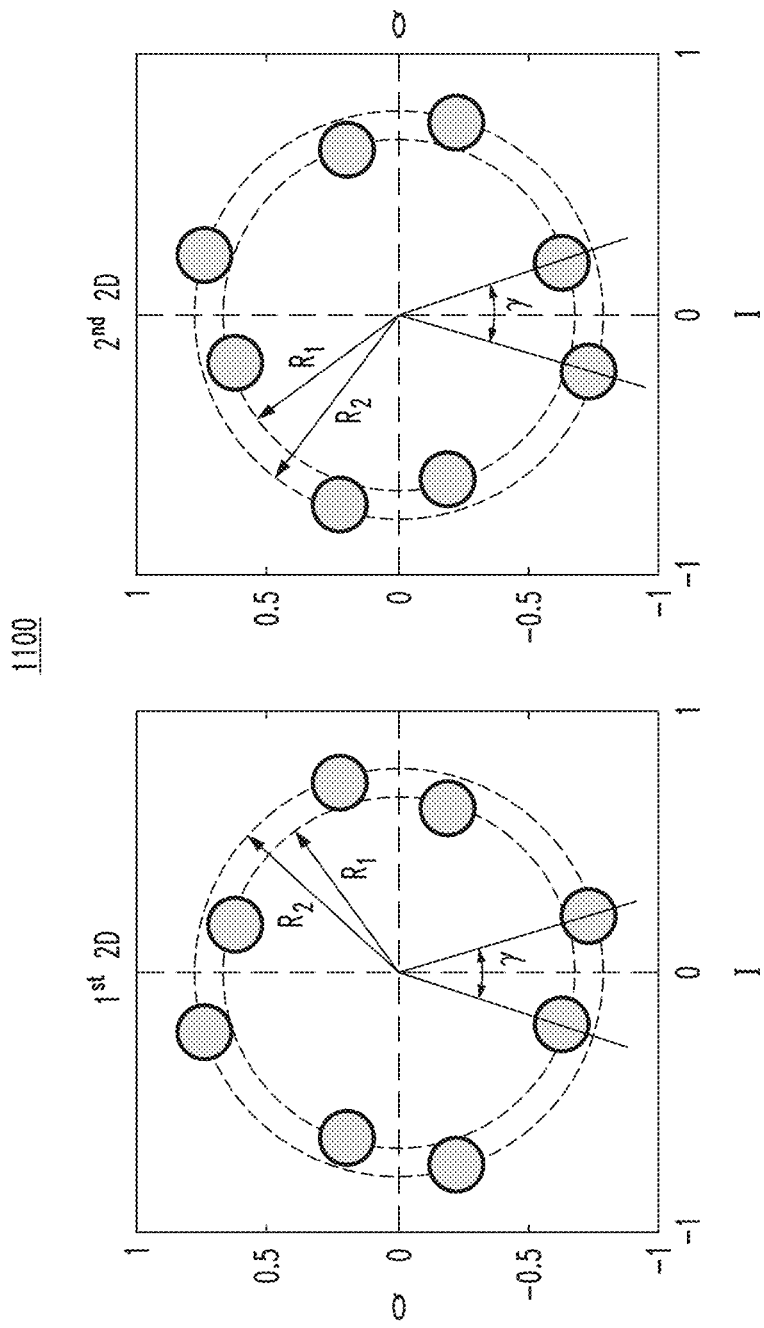
FIG. 12 graphically shows representative two-dimensional (2D) projections of a multipartite multidimensional constellation according to an embodiment.

FIG. 12 graphically shows representative 2D projections of 12D MMC 1100 according to an embodiment. More specifically, FIG. 12 displays two 2D projections of the first four (i.e., I-Q-X-Y) dimensions of 12D MMC 1100 corresponding to one of the three optical cores of the multi-core fiber. The other two pairs of 2D projections that complete the six 2D projections of 12D MMC 1100 are not shown, as they are identical to the pair of projections shown in FIG. 12. All together, the six 2D projections along with the selection rules of step 710 uniquely identify the 12D MMC 1100. As evident from FIG. 12, each of the 2D projections has two subsets of four points each, each subset being on the corresponding one of two different circles, of radii $R_1$ and $R_2$, respectively. The four points located on the same circle are equiangularly spaced, with 90-degree relative angular spacings, and are located in the four corners of the corresponding square (not shown in FIG. 12). The relative azimuthal angle γ between the closest points on the different circles of the same 2D projection is γ=0.15 radians. In this particular embodiment, the relative difference between the radii $R_1$ and $R_2$ is smaller than 15% but greater than 10%.

Provided that the unmodulated optical carrier (i.e., the optical output of laser source 20, FIG. 3) has an approximately constant total optical power per time slot, the optical signal modulated with 12D MMC 1100 also has an approximately constant total optical power per time slot in 4D, 8D, and 12D. For example, if a 12D constellation symbol has a projection on the first IQ plane (e.g., the left panel of FIG. 12) that falls on the circle of radius $R_1$, then that same 12D constellation symbol has a projection on the second IQ plane (e.g., the right panel of FIG. 12) that falls on the circle of radius $R_2$. Alternatively, if a 12D constellation symbol has a projection on the first IQ plane that falls on the circle of radius $R_2$, then that same 12D constellation symbol has a projection on the second IQ plane that falls on the circle of radius $R_1$. As such, the 12D MMC 1100 provides a constant-power modulation format, which can advantageously be used to better manage nonlinear distortions of transmitted optical signals, as mentioned above.

In an alternative embodiment, the 12 dimensions of the 12D MMC 1100 can be mapped onto the 12 degrees of freedom provided by: (i) three linearly coupled spatial modes of a three-core coupled-core multi-core optical fiber; (ii) I and Q components of an optical carrier; and (iii) two modulation time slots of the optical carrier.

In another alternative embodiment, the 12 dimensions of the 12D MMC 1100 can be mapped onto the 12 degrees of freedom provided by: (i) I and Q components of an optical carrier; (ii) X and Y polarizations of the optical carrier; and (iii) three modulation time slots of the optical carrier.

In yet another alternative embodiment, the 12 dimensions of the 12D MMC 1100 can be mapped onto the 12 degrees of freedom provided by: (i) three different carrier wavelengths or frequency tones of an optical signal; (ii) I and Q components of the optical carrier or frequency tone; and (iii) X and Y polarizations of the optical signal.

According to an example embodiment disclosed above, e.g., in the summary section and/or in reference to any one or any combination of some or all of FIGS. 1-12, provided is an apparatus, comprising an optical data transmitter (e.g., 110, FIG. 3) including: first and second in-phase and quadrature-phase (IQ) optical modulators (e.g., $24_X$, $24_Y$, FIG. 3); an optical combiner (e.g., 28, FIG. 3) connected to polarization-multiplex output light of the first and second IQ optical modulators; and an electronic controller (e.g., 12, FIG. 3) configured to cause the first IQ optical modulator to modulate first parts of multidimensional constellation symbols onto an optical carrier and to cause the second IQ optical modulator to modulate separate second parts of the multidimensional constellation symbols onto the optical carrier to cause the optical combiner to output about a same total optical power in each of modulation time slots, the first and second parts of each of the multidimensional constellation symbols spanning two or more consecutive ones of the modulation time slots; wherein paired in-phase and quadrature coordinates of each of the first and second parts of the multidimensional constellation symbols have values corresponding to first and second circles (e.g., of radii $R_1$ and $R_2$, FIG. 12) in a corresponding complex plane; and wherein the electronic controller is configured to cause at least one of the first and second IQ optical modulators to modulate different sets of the paired in-phase and quadrature coordinates in said consecutive ones of the modulation time slots of each multidimensional constellation symbol.

In some embodiments of the above apparatus, the electronic controller is configured to cause both of the first and second IQ optical modulators to modulate different sets of the paired in-phase and quadrature coordinates in said consecutive ones of the modulation time slots of each multidimensional constellation symbol.

In some embodiments of any of the above apparatus, the electronic controller is configured to cause, at least, one of the first and second IQ optical modulators to modulate sets of the paired in-phase and quadrature coordinates characterized by different directions from a center of the corresponding complex plane in said consecutive ones of the modulation time slots of each multidimensional constellation symbol.

In some embodiments of any of the above apparatus, radii of the first and second circles differ by less than 15%.

In some embodiments of any of the above apparatus, radii of the first and second circles differ by more than 10%.

In some embodiments of any of the above apparatus, different sets of the paired in-phase and quadrature-phase coordinates correspond to corners of relatively rotated squares in the corresponding complex plane.

In some embodiments of any of the above apparatus, the relatively rotated squares have sides whose lengths differ by less than 15%.

In some embodiments of any of the above apparatus, the relatively rotated squares have sides whose lengths differ by more than 10%.

In some embodiments of any of the above apparatus, the first and second circles are concentric.

In some embodiments of any of the above apparatus, the multidimensional constellation symbols belong to a constellation having eight or more dimensions.

According to another example embodiment disclosed above, e.g., in the summary section and/or in reference to any one or any combination of some or all of FIGS. 1-12, provided is an apparatus, comprising a coherent optical data receiver (e.g., 170, FIG. 4) including: an optical hybrid (e.g., 60, FIG. 4) configured to mix an optical data signal (e.g., 30, FIG. 4) and an optical local-oscillator signal (e.g., 58, FIG. 4) to generate a respective plurality of mixed optical signals for each of first and second mutually orthogonal polarizations of the optical data signal; a plurality of photodetectors (e.g., $61_1$-$61_4$, FIG. 4) connected to the optical hybrid to convert the mixed optical signals into separate streams of measurements (e.g., $68_1$-$68_4$, FIG. 4) of in-phase and quadrature components of each of said first and second mutually orthogonal polarizations; and a digital signal processor (e.g., 70, FIG. 4) configured to process said separate streams to recover data modulated onto the optical data signal in which a multidimensional modulation symbol spans two or more consecutive modulation time slots, different ones of said consecutive modulation time slots having different parts of the multidimensional modulation symbol; wherein the digital signal processor is further configured to identify a multidimensional constellation symbol corresponding to the multidimensional modulation symbol by comparing the measurements in said consecutive modulation time slots and corresponding sets of values of a constellation; wherein paired in-phase and quadrature coordinates of each of first and second parts of each multidimensional constellation symbol of the constellation have values corresponding to first and second circles (e.g., of radii $R_1$ and $R_2$, FIG. 12) in a corresponding complex plane; and wherein at least some sets of the paired in-phase and quadrature coordinates determined based on the multidimensional modulation symbol in said consecutive modulation time slots are different.

According to yet another example embodiment disclosed above, e.g., in the summary section and/or in reference to any one or any combination of some or all of FIGS. 1-12, provided is an apparatus, comprising an optical data transmitter including: a plurality of in-phase and quadrature-phase (IQ) optical modulators (e.g., 24, FIG. 3); and an electronic controller (e.g., 12, FIG. 3) configured to operate the IQ optical modulators to optically output a sequence of multidimensional constellation symbols to an end of an optical fiber (e.g., 140, FIG. 1) such that, near the end, each of the multidimensional constellation symbols has separate parts thereof primarily carried by different respective guided modes of the optical fiber, said separate parts forming two or more respective optical signal streams in the optical fiber; and wherein the electronic controller is configured to cause the two or more optical signal streams to be different in at least some modulation time slots.

In some embodiments of the above apparatus, each of the multidimensional constellation symbols spans two or more consecutive modulation time slots.

In some embodiments of any of the above apparatus, the electronic controller is configured to cause individual ones of the multidimensional constellation symbols to have separate portions thereof primarily carried, near the end of the optical fiber, in orthogonal polarization components of the guided modes.

In some embodiments of any of the above apparatus, the electronic controller is configured to cause individual ones of the multidimensional constellation symbols to have separate portions thereof primarily carried, near the end of the optical fiber, in mutually orthogonal polarization components of the guided modes.

In some embodiments of any of the above apparatus, the electronic controller is configured to cause the separate parts of each of the multidimensional constellation symbols in different ones of the guided modes to be from corresponding different preselected patterns of values (e.g., corresponding to $1^{st}$ 2D and $2^{nd}$ 2D projections of FIG. 12).

In some embodiments of any of the above apparatus, different ones of the multidimensional constellation symbols have about a same total optical power in each modulation time slot.

In some embodiments of any of the above apparatus, the multidimensional constellation symbols belong to a constellation having eight or more dimensions.

According to yet another example embodiment disclosed above, e.g., in the summary section and/or in reference to any one or any combination of some or all of FIGS. 1-12, provided is an apparatus, comprising a coherent optical data receiver including: an optical front-end configured to output a plurality of parallel sequences of measurements of different phase and polarization components of two or more optical signal streams each received primarily from a corresponding guided mode of an optical fiber end-coupled to the coherent optical data-receiver; and a digital signal processor configured to determine, from the measurements, a stream of multidimensional constellation symbols having separate parts thereof in the two or more of the optical signal streams; and wherein each of the two or more of the optical signal streams corresponds to a different independent linear combination of the separate parts.

In some embodiments of the above apparatus, the multidimensional constellation symbols belong to a constellation having eight or more dimensions.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising an optical data transmitter including:
    first and second in-phase and quadrature-phase (IQ) optical modulators;
    an optical combiner connected to polarization-multiplex output light of the first and second IQ optical modulators; and
    an electronic controller configured to cause the first IQ optical modulator to modulate first parts of multidimensional constellation symbols onto an optical carrier and to cause the second IQ optical modulator to modulate separate second parts of the multidimensional constellation symbols onto the optical carrier to cause the optical combiner to output about a same total optical power in each of modulation time slots, the first and second parts of each of the multidimensional constellation symbols spanning three or more consecutive ones of the modulation time slots;
    wherein paired in-phase and quadrature coordinates of each of the first and second parts of the multidimensional constellation symbols have values corresponding to first and second circles in a corresponding complex plane; and
    wherein the electronic controller is configured to cause at least one of the first and second IQ optical modulators to modulate different sets of the paired in-phase and quadrature coordinates in said consecutive ones of the modulation time slots of each multidimensional constellation symbol.

2. The apparatus of claim 1, wherein the electronic controller is configured to cause both of the first and second IQ optical modulators to modulate different sets of the paired in-phase and quadrature coordinates in said consecutive ones of the modulation time slots of each multidimensional constellation symbol.

3. The apparatus of claim 1, wherein the electronic controller is configured to cause, at least, one of the first and second IQ optical modulators to modulate sets of the paired in-phase and quadrature coordinates characterized by different directions from a center of the corresponding complex plane in said consecutive ones of the modulation time slots of each multidimensional constellation symbol.

4. The apparatus of claim 1, wherein radii of the first and second circles differ by less than 15%.

5. The apparatus of claim 4, wherein radii of the first and second circles differ by more than 10%.

6. The apparatus of claim 1, wherein different sets of the paired in-phase and quadrature-phase coordinates correspond to corners of relatively rotated squares in the corresponding complex plane.

7. The apparatus of claim 6, wherein the relatively rotated squares have sides whose lengths differ by less than 15%.

8. The apparatus of claim 6, wherein the relatively rotated squares have sides whose lengths differ by more than 10%.

9. The apparatus of claim 1, wherein the first and second circles are concentric.

10. The apparatus of claim 1, wherein the multidimensional constellation symbols belong to a constellation having twelve or more dimensions.

11. An apparatus, comprising a coherent optical data receiver including:
    an optical hybrid configured to mix an optical data signal and an optical local-oscillator signal to generate a respective plurality of mixed optical signals for each of first and second mutually orthogonal polarizations of the optical data signal;
    a plurality of photodetectors connected to the optical hybrid to convert the mixed optical signals into separate streams of measurements of in-phase and quadrature components of each of said first and second mutually orthogonal polarizations; and
    a digital signal processor configured to process said separate streams to recover data modulated onto the optical data signal in which a multidimensional modulation symbol spans three or more consecutive modulation time slots, different ones of said consecutive modulation time slots having different parts of the multidimensional modulation symbol;
    wherein the digital signal processor is further configured to identify a multidimensional constellation symbol corresponding to the multidimensional modulation symbol by comparing the measurements in said consecutive modulation time slots and corresponding sets of values of a constellation;
    wherein paired in-phase and quadrature coordinates of each of first and second parts of each multidimensional constellation symbol of the constellation have values corresponding to first and second circles in a corresponding complex plane; and
    wherein at least some sets of the paired in-phase and quadrature coordinates determined based on the multidimensional modulation symbol in said consecutive modulation time slots are different.

12. An apparatus, comprising an optical data transmitter including:
    a plurality of in-phase and quadrature-phase (IQ) optical modulators; and
    an electronic controller configured to operate the IQ optical modulators to optically output a sequence of multidimensional constellation symbols to an end of an optical fiber such that, near the end, each of the multidimensional constellation symbols has separate parts thereof primarily carried by different respective guided modes of the optical fiber, said separate parts forming two or more respective optical signal streams in the optical fiber;
    wherein the electronic controller is configured to cause the two or more optical signal streams to be different in at least some modulation time slots; and
    wherein each of the multidimensional constellation symbols spans three or more consecutive modulation time slots.

13. The apparatus of claim 12, wherein the electronic controller is configured to cause individual ones of the multidimensional constellation symbols to have separate portions thereof primarily carried, near the end of the optical fiber, in mutually orthogonal polarization components of the guided modes.

14. The apparatus of claim 12, wherein the electronic controller is configured to cause the separate parts of each of the multidimensional constellation symbols in different ones of the guided modes to be from corresponding different preselected patterns of values.

15. The apparatus of claim 12, wherein different ones of the multidimensional constellation symbols have about a same total optical power in each modulation time slot.

16. The apparatus of claim 12, wherein the multidimensional constellation symbols belong to a constellation having twelve or more dimensions.

17. An apparatus, comprising a coherent optical data receiver including:

an optical front-end configured to output a plurality of parallel sequences of measurements of different phase and polarization components of two or more optical signal streams each received primarily from a corresponding guided mode of an optical fiber end-coupled to the coherent optical data-receiver; and a digital signal processor configured to determine, from the measurements, a stream of multidimensional constellation symbols having separate parts thereof in the two or more of the optical signal streams;

wherein each of the two or more of the optical signal streams corresponds to a different independent linear combination of the separate parts; and wherein each of the multidimensional constellation symbols spans three or more consecutive modulation time slots.

18. The apparatus of claim 17, wherein the multidimensional constellation symbols belong to a constellation having eight twelve or more dimensions.

* * * * *

UNITED STATES PATENT AND TRADEMARK OFFICE
CERTIFICATE OF CORRECTION

| | |
|---|---|
| PATENT NO. | : 11,309,972 B2 |
| APPLICATION NO. | : 17/025353 |
| DATED | : April 19, 2022 |
| INVENTOR(S) | : Juan Ignacio Bonetti et al. |

It is certified that error appears in the above-identified patent and that said Letters Patent is hereby corrected as shown below:

On the Title Page

Under Item (56) References Cited, add "et al." after "Petrov."

Under Item (56) Other Publications, in the second Column on page 2, replace "xii-xviii" with --xiii-xviii-- for all of the six publications by T.M. Cover and J.A. Thomas In the Claims In Claim 18, replace "a constellation having eight twelve or more dimensions." with --a constellation having twelve or more dimensions.--

Signed and Sealed this
Twenty-first Day of November, 2023

Katherine Kelly Vidal
*Director of the United States Patent and Trademark Office*